April 27, 1926. 1,582,066
H. K. MOORE
PROCESS OF AND APPARATUS FOR MULTIPLE EFFECT EVAPORATIVE SEPARATION
Filed Oct. 16, 1922 5 Sheets-Sheet 4
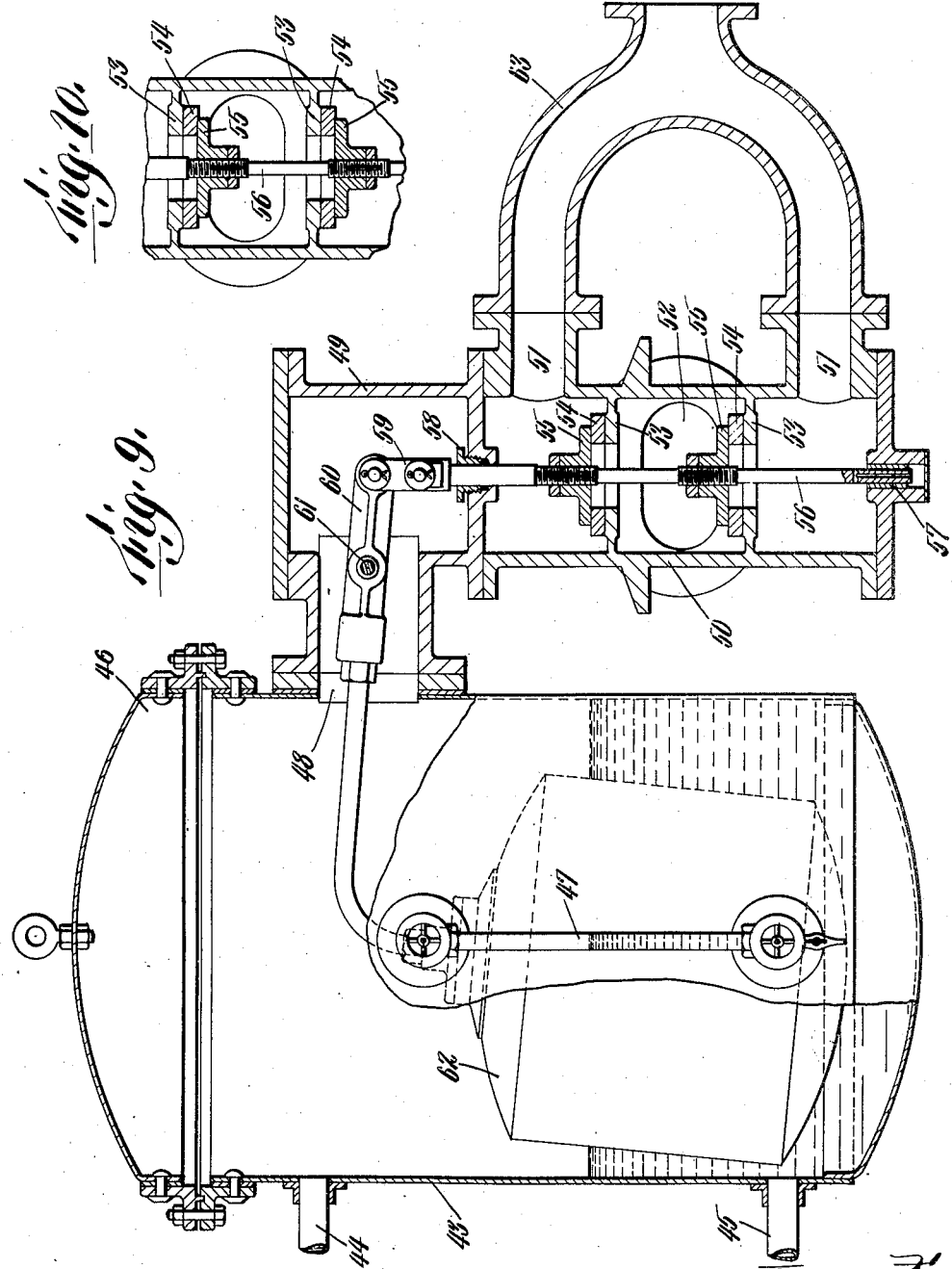
Inventor
Hugh K. Moore

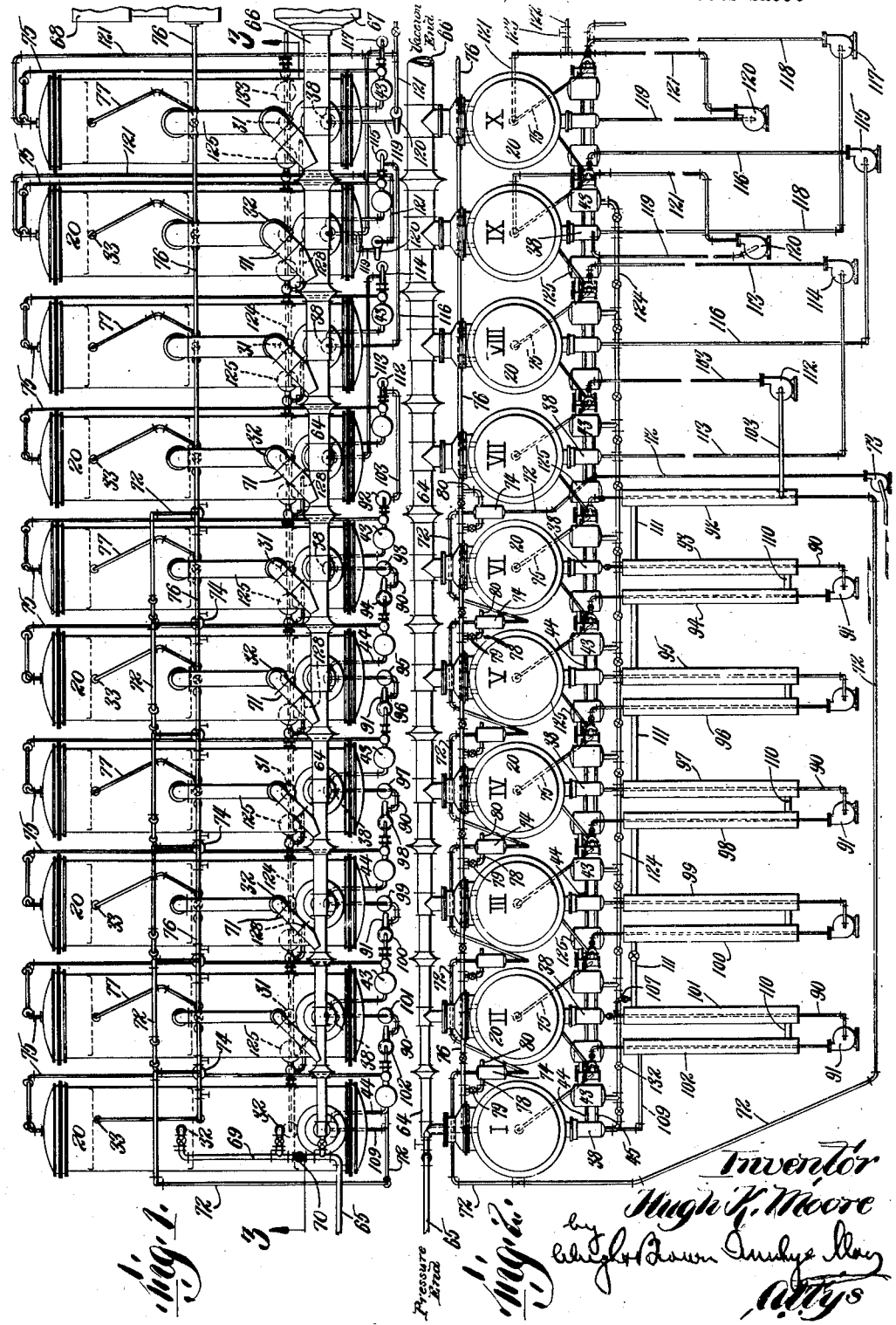

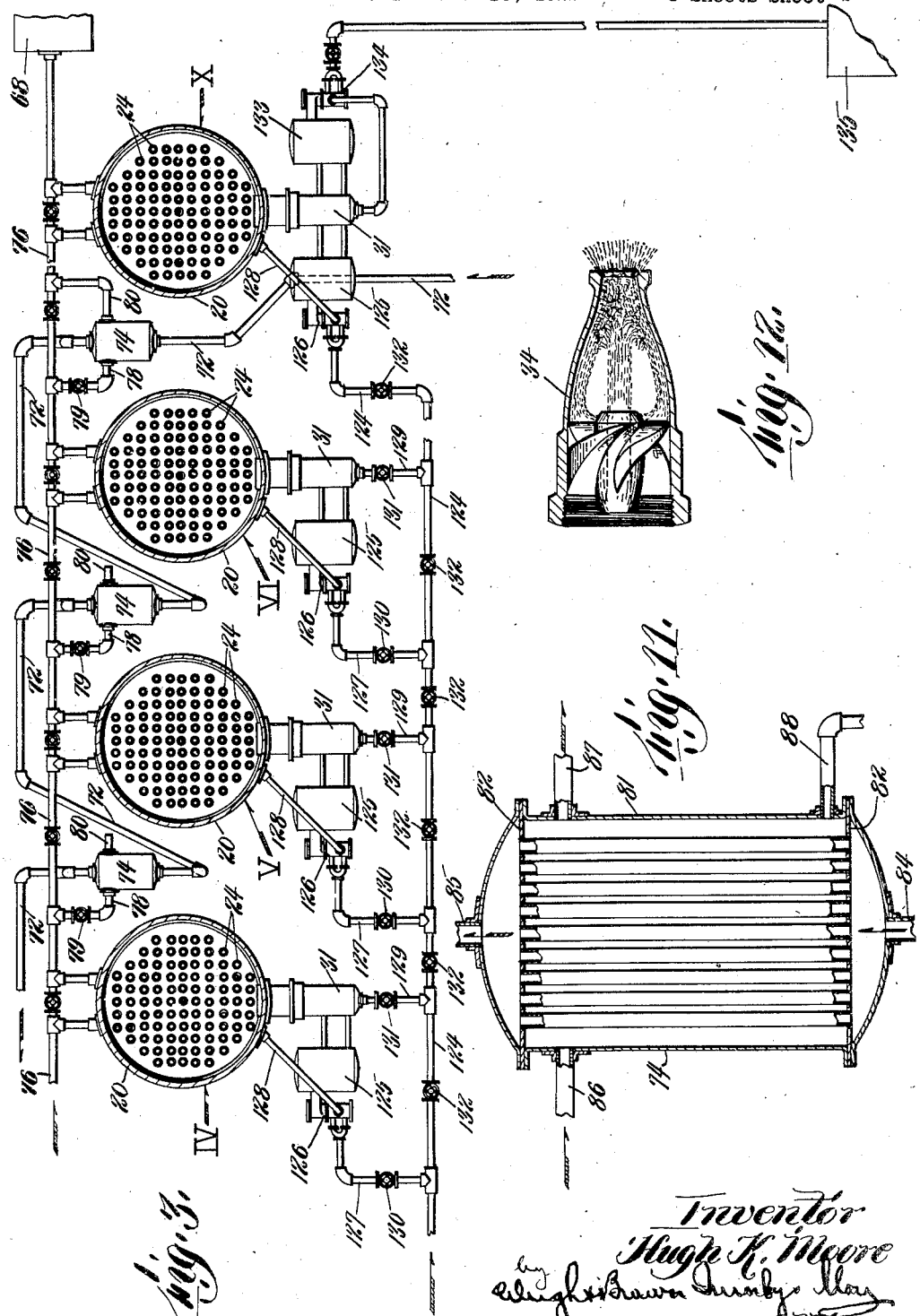

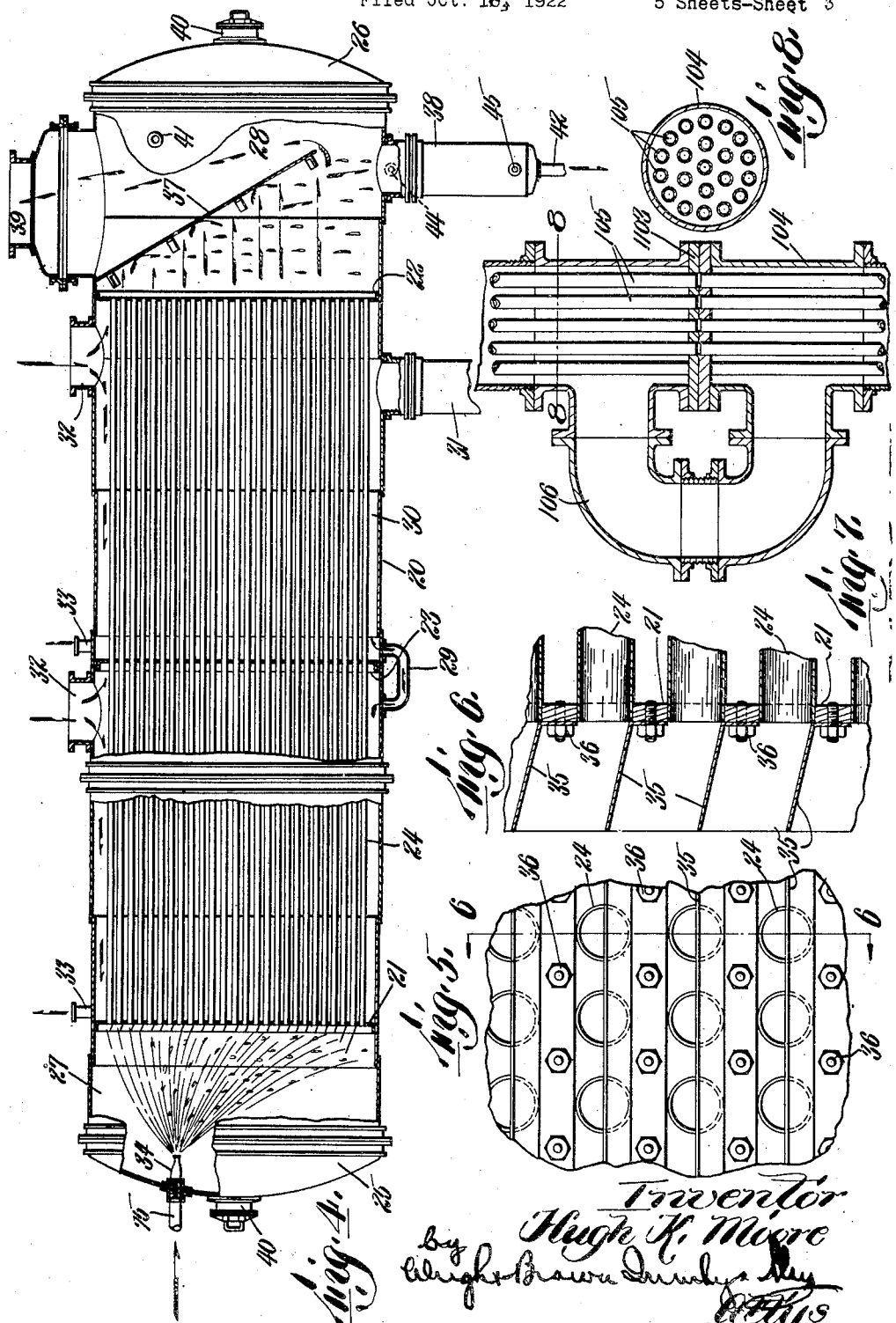

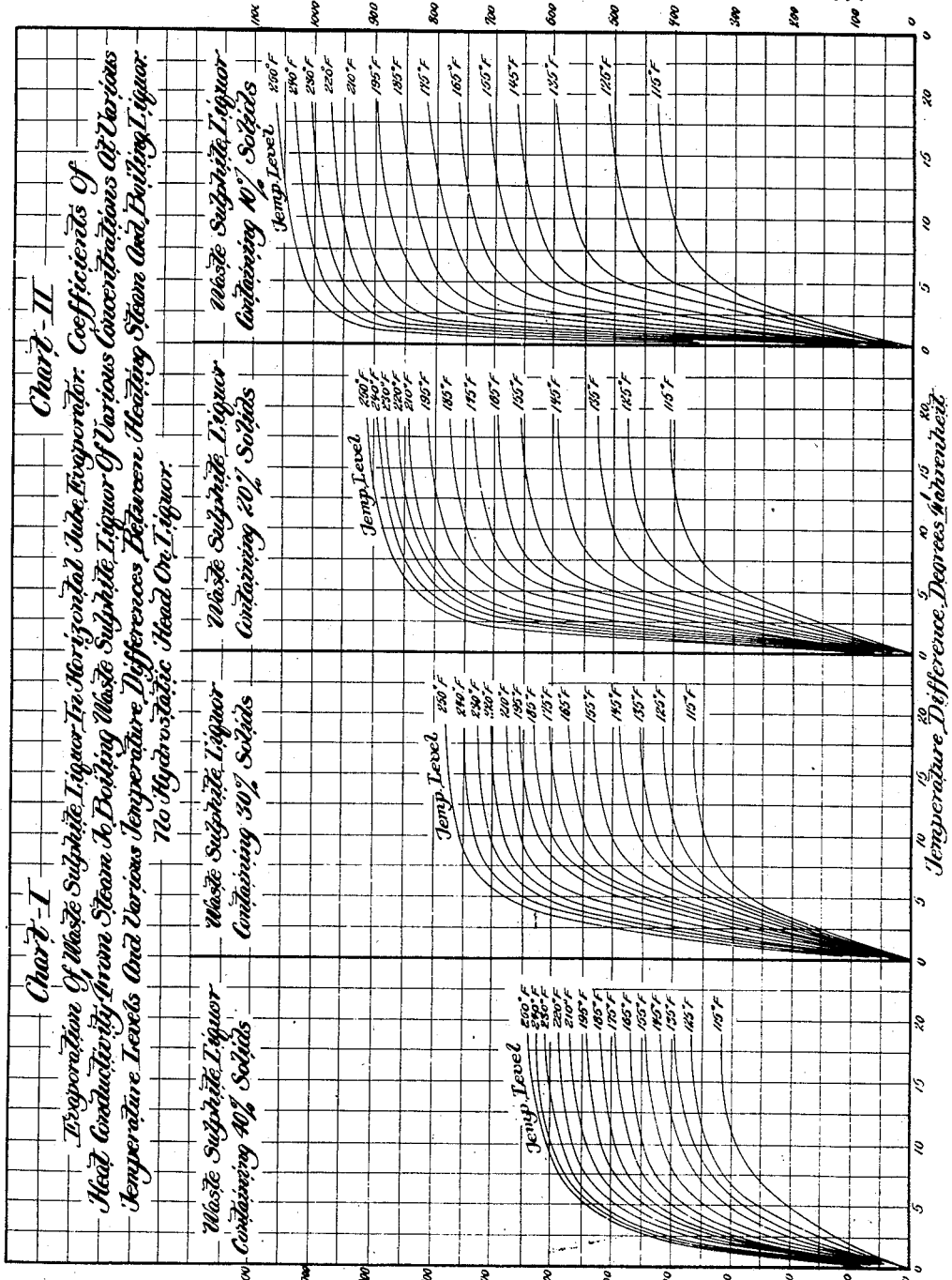

Patented Apr. 27, 1926.

1,582,066

UNITED STATES PATENT OFFICE.

HUGH K. MOORE, OF BERLIN, NEW HAMPSHIRE, ASSIGNOR TO BROWN COMPANY, OF BERLIN, NEW HAMPSHIRE, A CORPORATION OF MAINE.

PROCESS OF AND APPARATUS FOR MULTIPLE-EFFECT EVAPORATIVE SEPARATION.

Application filed October 16, 1922. Serial No. 595,017.

*To all whom it may concern:*

Be it known that I, HUGH K. MOORE, a citizen of the United States, residing at Berlin, in the county of Coos and State of New Hampshire, have invented new and useful Improvements in Processes of and Apparatus for Multiple-Effect Evaporative Separation, of which the following is a specification.

This invention relates to the separation of liquids from solids by evaporation, and has for its general object the utilization to a maximum extent of the heat contained in a given quantity of steam in such separation.

There are many liquids, consisting of one or more solids dissolved in a solvent, which may be utilized for various purposes when the solvent is separated from the solid. For example, in aqueous solutions, the water may be separated from the solid to permit the use of the solid, or to permit the use of the water, depending on the use-value of either. In nonaqueous solutions, it is at times desirable to recover both the solvent, e. g. naphtha, and the solid, e. g. wool grease. More especially there are liquids which today are wasted in large quantities, but which might be utilized were it possible to effect the separation of the liquids and solids by an economical process of evaporation. Thus, in the manufacture of sulphite pulp, it has been the custom for many years to discharge the waste liquor from the blow-pit (after the pulp has been separated therefrom) into streams and rivers with the resulting pollution of such streams and the destruction of fish and other marine life. The volume of such liquor is so great, the present uses of the solids in the arts so small, and the cost of evaporation so great that evaporation is resorted to only in certain small localities where the laws require it. Such sulphite liquor contains matter in solution which can be put to various uses however, even if only used for combustion purposes and the contained lime or magnesia. According to present methods of evaporation, the heat required for concentrating the liquor and recovering the mineral content, on account of the extreme dilution of the liquor, would be greater than the heat obtained from the combustion of the combustible content of the liquor, and the cost would be greater than the value of the recovered minerals and the heat value of the combustible content. It is well known that sulphite liquor contains fermentable sugars, but here again the extreme dilution of the liquor is an obstacle to the recovery of the alcohol which may be produced from such sugars, as the great volume of liquor must be cooled to a temperature at which fermentation will take place, and then heated to distill off the alcohol. As the alcohol content is approximately between .5% and 1% of the total liquor, the cost of the heat required for this separation, even in efficient column stills, exceeds the possible profit from the sale of the alcohol, not to speak of the cost of the investment required to hold the enormous quantities of liquor for the necessary period of time and the other expenses required to keep the tanks bacteria-free, incidental to such process of fermentation. In this connection it may be pointed out that I make specific reference to sulphite liquor, as in the description of a process and apparatus for carrying out my invention. I explain them in connection with the separation of the solids from the water of sulphite liquor, since, for the purposes of illustration, it is desirable to make reference to some specific liquor. Of course, it will be understood at this point that, although some features of the invention as set forth in the claims relate especially to the treatment of such liquor, yet in its broader aspects the invention may be utilized in separating the solids and liquids of many other solutions.

Heretofore it has been the generally accepted fact that four and a fraction pounds of water evaporated per pound of steam is the maximum efficiency which can be obtained. According to my invention, however, I am able to evaporate in excess of twice that amount of water per pound of steam. In accomplishing this, I employ the main known principles of multiple-effect evaporation, but I also use other principles which have not heretofore been recognized or practiced in commercial evaporation. And in addition I provide certain new steps and apparatus which contribute towards the desired end, for carrying out these principles.

There are certain factors which, according to my investigations, enter into efficient multiple-effect evaporation, and all of these must be and are, in my invention, observed to secure the maximum efficiency hereinbefore stated. Some of these may be briefly referred to as follows: 1, temperature difference including rise in boiling point due to concentration; 2, static head; 3, temperature level; 4, velocity; 5, viscosity; 6, sequence in evaporation; 7, entrained air elimination; 8, elimination of evaporated water; 9, automatic control; 10, wet conducting surfaces; 11, mechanical construction; and 12, number of effects.

*Temperature difference.*—It is important that the temperature spread between the steam entering the first effect and the steam entering the condenser from the last effect should be reduced to the minimum, for the reason that the greater the temperature spread the greater is the amount of steam required to heat the entering liquor (to be separated) to its boiling point in the first effect, with the resultant loss in steam evaporated in that effect. Of course, this is true with all the effects, but with an increasing amount of evaporation in all the succeeding effects as the temperature is reduced. In such latter case, the greater part of the heat finally goes unutilized to the condenser in the form of latent heat. It so happens that the temperature spread between the entering steam and the leaving steam, divided by the number of effects (if one neglects the rise in boiling point of the liquor due to concentration) gives the average temperature difference between the effects. This is strictly true, however, only of liquors containing no dissolved substances (either liquid or solid), but in all practical operations such liquors are not treated, except in the distillation of substantially pure water. In all industrial operations, one must take into account the rise in boiling point, due to concentration of the liquor under undergoing separation. Therefore the method of determining the average temperature difference, hereinbefore stated, is incorrect in industrial operations, and such difference may or may not apply to any single effect. Not only do the variations in the rise in boiling point bring about widely differing results in determining the individual temperature differences in each effect, but also there are other variables which greatly affect the results, such as viscosity of the liquor, variations in static head, velocity of the liquor, temperature level, etc. Such other variables are hereinafter considered because of their greatly affecting the temperature differences in each effect, bearing in mind that such temperature difference in each effect must be reduced to the minimum.

*Static head of liquor.*—The effect of static head of liquor being evaporated on the temperature difference in each evaporator is of far reaching importance. For example, when pure water is being evaporated, at 28 inches vacuum it boils at 100° F., at 25.85 inches vacuum it boils at 126.15° F. and at 11.6 inches vacuum it boils at 188.27° F. Assuming that 1.15 feet of water is equal to 1 inch of mercury, the difference between 28 inches vacuum and 25.85 inches vacuum equals a static head of 2.47 feet of water. Therefore, if the depth of water over the horizontal bottom tubes of the evaporator were 2.47 feet, the water at 28 inches vacuum would have to be 26.15° F. hotter at the bottom than at the top or heated to 126.15° F. in order to boil at a distance of 2.47 feet below the top level of the liquor. Consequently the temperature difference between the steam required to boil the water and the water to be boiled must be 26.15° F. greater at the top than at the bottom of the body of water. Again considering water boiling at 126.15° F. under 25.85 inches vacuum, and water boiling at 188.27° F. under 11.6 inches vacuum:—there is a difference of 14.25 inches mercury or equivalent to 16.38 feet of water, and the difference in temperature under this static head of water would be 62.12° F. Hence in a vertical tube evaporator having water to the height of 16.38 feet, in order for the water to boil at the bottom of the tube, it must be 62.12° F. hotter than at the top. In like manner, the temperature difference must be 62.12° F. greater at the top than at the bottom in order to have the water boil at the bottom. From these examples, it will be noted that in the first case the average difference in temperature due to a static head of 1 foot in height of water is 10.6° F.; and in the second case the average difference in temperature per foot in height of water is 3.8° F. This temperature difference, due to a static head of 1 foot of water in the successive evaporators, diminishes with the increase in pressure. This difference alone, which is due entirely to the static head, prevents using small differences of temperature exchange between the steam and the water to be boiled thereby. This is true of horizontal tube as well as vertical tube evaporators. In the foregoing examples, pure water only was considered, but, when aqueous solutions are to be treated, the specific gravity of such solutions must be taken into consideration, with the consequent increase in the temperature difference. In the example first herein given, if the solution had a specific gravity of 1.5, then a static head of 2.47 feet of liquor would equal 3.70 feet of water, and require, instead of 26.15° F. temperature difference at the top of the body of liquor, a temperature difference of 33.83° F. It is evident from the foregoing that, if the temperature differences are kept constant, the addition of heating surfaces, which requires greater depth of liquor to cover them (whether such surfaces be vertical or horizontal), will have no effect in increasing the capacity or efficiency of the evaporator. Multiple-effect evaporators are practically only used in those evaporator problems in which the capacity is so great as to render the cost item of fuel of prime importance. The only known way to increase capacity in an evaporator is to increase the area of heating surface or the difference in temperature between the heating and the heated media. But from what has been stated heretofore herein, it will be seen that increasing the capacity by increasing the temperature difference can only be done at the sacrifice of efficiency. An increase in heating surface of an evaporator can only be accomplished by extending it in any one or all of three directions. But I have shown that an increase in the vertical dimension means an increase in the static head of the liquor and an increase in the temperature difference, with a consequent loss in efficiency. An increase in width of heating surface without an increase in the vertical height of such surface requires an impractical mechanical construction. This leaves only the horizontal length of the heating surface to be increased, and this is impractical when the cost of construction, not to speak of excessive required floor space, is taken into account. According to my invention, as will be subsequently explained, all three dimensions of heating surface may be increased, without having any measurable static head and without using a structure which is mechanically weak or impracticable or entailing a prohibitive cost.

*Temperature level.*—By this term I mean the temperature of the boiling liquor at its surface, and the temperature level is here considered because of its effect on heat conductivity and its constituting an important factor in evaporative separation. By heat conductivity, I mean the amount of heat conducted through 1 square foot of heating surface per hour per degree difference of exchange, each unit being referred to hereinafter at B. t. u. On the accompanying drawing, four graphs are shown illustrating the heat conductivity, at different temperature levels, of liquors having different proportions of solids dissolved therein; from which it will appear, as hereinafter explained, that the heat conductivity increases with the temperature level. This increase is of importance as it directly affects the temperature difference between successive effects. Illustrative of this function, it may be assumed that in two effects, or individual combined condensers and evaporators, of a multiple-effect evaporative separator, the amount of transmitted heat is the same, but, if the heat conductivity of the liquor in the first is twice that of the second, per degree of difference of exchange, then, in order to transmit the same amount of heat in each case, either the heating surface of the first must be reduced or the heating surface may remain as it was and the temperature difference must be reduced, or both must be reduced. In commercial practice, it is not practicable to build each effect of an evaporator different from the others. Therefore, for reasons of practicability and economy, the several effects should be made alike, as far as heating surface is concerned, and the variations in heat transmitted, due to variations in temperature level, compensated for by increasing or decreasing the temperature difference. This occurs automatically when the evaporator is in proper operation, but is referred to here, not that according to my invention I have to compensate for changes caused by temperature level, but because, given a temperature spread for the whole multiple evaporator, one is able to calculate how many effects may be involved in the temperature spread.

*Velocity.*—I have determined that the heat conductivity of metallic conductor walls is largely dependent on the factor of velocity of the heating and heated media separated by such walls. Liquids when quiescent are poor conductors of heat, and the more rapidly fresh molecules of such liquids are brought into contact with the wall surface, the greater the rate at which heat is conducted from the wall to the liquid or vice versa. Consequently, in evaporative separation, the greatest efficiency (other factors being disregarded) is obtained when the heating and heated liquids are caused to flow in such manner as to bring fresh molecules into contact with the conductor wall surface in the minimum space of time. This may be accomplished either by corrugating or bending the conductor wall, or by increasing the velocity of the liquids. The corrugating or bending of the conductor tubes is impracticable in evaporative separation where liquids are to be separated from the solids dissolved therein, because of the deposit of such solids in the pockets formed by such corrugations or bends and the difficulty of keeping or cleaning the conductor surfaces free from such deposits. Naturally, the formation of such deposits retards the heat flow and requires a greater temperature difference in the heating and heated media, and decreases the efficiency of the evaporator. But by increasing the velocity of the heating and heated media, eddy currents are formed which tend to replace those molecules in contact with the conducting surface with fresh molecules, and the greater the velocity the higher the heat conductivity. Thus straight conducting tubes may be used and their surfaces kept free from deposits.

*Viscosity.*—As the viscosity of the liquid undergoing evaporative separation increases, the velocity with which fresh molecules may be brought into contact with the conductor wall surface decreases, with a resulting decrease in the heat conductivity. But, since viscosity is dependent not only on the concentration of a given liquid, but also on the temperature of the liquid, and, as most liquids decrease in viscosity with increasing temperatures, it is evident that, as the concentration and consequent increased viscosity at a given temperature increase, the temperature of the liquid should also be increased as far as is practicable. Accordingly, in order to maintain a low temperature difference between the heating and heated media, these factors should be considered as far as possible in obtaining efficient evaporative separation, having due regard to the particular liquid undergoing treatment.

*Sequence in evaporation.*—For economical and efficient evaporative separation, the arrangement and number of components or effects in the evaporating apparatus and the flow of the steam and the liquor through the effects in proper sequence constitute an important factor, taking into due account the initial temperature and the nature of the liquor to be separated. For economical operation, it is important that the smallest quantity of entering steam should be utilized, the sensible heat in the entering liquor conserved, and the least amount of latent heat wasted. It is self evident (disregarding radiation and convection) that all of the heat entering the evaporator in any form must leave the evaporator, first, as sensible heat in the evaporated liquid; second, as heat in steam to the final condenser; and, third, as heat in the residual liquor. To secure the greatest efficiency, it is important that, of the total heat, the percentage passing to the condenser should be reduced to the minimum, the heat in the condensed evaporated liquid increased to a maximum, with the lowest possible temperature of such liquid, and the heat in the residual liquor reduced to a minimum unless there are especial reasons for recovering such liquor at a high temperature. In actual practice, four effects (for forward flow) have been regarded as the maximum for efficient and economical evaporation, though five or six effects have infrequently been used. This is due to the diminishing evaporation in the effects, in passing from the vacuum end to the entering-steam end in the series, as the greater part of the heat of the entering steam is utilized in heating the initially cold liquor. The succeeding increase in evaporation, in passing to the vacuum end is due to the liberation of the heat thus stored in the liquor. In backward evaporation, i. e. where the liquor passes counter-current to the steam, the liquor is heated in stages, as it were, and the greatest evaporation occurs in the effect heated by the initial steam, and the evaporation decreases slightly in the several effects toward the vacuum end due to the heating of the liquor in such stages. Thus, if the liquor is cold on entering the last effect, a large part of the latent heat of the steam, which would ordinarily enter the condenser, is utilized in heating the initial liquor entering the last effect; whereas, if the entering liquor in the last effect is hot or above the boiling point of the liquor in the last effect, then the heat contained therein in excess of the heat contained in the liquor at the boiling point in the last effect will be liberated as steam to the condenser, and thus such sensible heat as is in the liquor will not be conserved. In such cases, resort, according to my invention as hereinafter described, must be made to what I may term mixed evaporation, which provides for entering the liquor to be evaporated in an intermediate effect which is chosen with due regard to the temperature of the entering liquor. Such effect should be the one in which the boiling point of the liquor therein is close to or preferably just above, the temperature of the entering liquor. The liquor may now be subjected to what I may term "backward" evaporation until it reaches the first effect. The liquor will then enter the first of the remaining effects and then in such effects be subjected to forward evaporation. But inasmuch as this liquor may be in great quantity and contain a large amount of stored heat, it cannot be entered directly into the last-mentioned effects without losing some of the efficiency of the stored heat. Since, in backward evaporation, the boiling point of the liquor in any effect is higher than that of the liquor entering therein, it may be seen that the heat of the liquor leaving the effect in which it is at its highest temperature may be caused to transfer a part of its heat to the liquor entering such effect. Such leaving liquor, from which a part of its heat has been abstracted, may then transfer a portion of its heat to the liquor entering the next effect of the series, and this may be continued in steps or stages until the initial liquor to be evaporatively separated is so heated. Thus one may abstract and utilize a large amount of sensible heat stored in the liquor emerging from the backward evaporation series of effects, and the liquor thus relieved of its utilizable heat may now be entered into the series of forward evaporation effects. By this "mixed" evaporation, I obtain the advantages of backward evaporation and still conserve to as great an extent as possible the heat in the initial liquor to be treated.

*Entrained air elimination.*—Another factor of importance, which must be considered in the commercial separation of the liquor by evaporation, is the elimination of entrained air or of gases resulting from the decomposition of components in the liquor, or of air which fortuitously leaks into the evaporator system, as otherwise these uncondensable gases would fill space which should be available for steam and would prevent the operation of the evaporating system.

*Elimination of evaporated water.*—In every multiple-effect evaporator, each effect or component performs the functions of evaporating and of condensing. It is necessary to eliminate such condensate as would otherwise accumulate in order to prevent such an accumulation of condensed evaporated water as would interfere with the proper operation of the system. Provision must therefore be made for eliminating the "drip" or condensed evaporated water.

*Automatic control.*—In the practical operation of multiple-effect evaporators as heretofore commercially constructed, it has been necessary to employ a large liquid capacity in the several effects due to their construction, and it has been customary to control the operation of the several effects by manually-operated valves, located between the several effects, in order to regulate the height of liquor in each effect. In actual practice, the adjustment of any one of the valves makes it necessary to adjust to a greater or lesser extent all of the other valves for reasons which will be apparent to one familiar with multiple-effect evaporators. While this is feasible in a multiple-effect evaporator having a relatively small number of effects, even though such adjustment may require the constant service of an operator, yet, when the effects are multiplied and a small temperature variation is employed, the difficulties attendant upon manual manipulation of the valves become insuperable. When a large number of effects are to be utilized and the storage capacity of the effects is greatly reduced, it becomes essential to provide some method of eliminating manual control by the utilization of an automatic control for maintaining the height of liquor in the individual effects practically constant. Thus automatic control becomes an important factor in the efficient and economical operation of a multiple-effect evaporator such as hereinafter described in detail in the following specification.

*Wet conducting surfaces.*—The volume of liquor passing through a multiple-effect evaporator diminishes as it is increasingly concentrated. When a usual commercial evaporator is employed, the large storage capacity of the several effects, in which the conducting tubes are immersed, make it possible for the tubes, whether horizontal or vertical, to be constantly immersed in the liquor undergoing evaporation therein, and the problem of maintaining the heat-conducting surfaces of the tubes wet with the liquor does not arise except in connection with the control of the system by the hand-valve-manipulation hereinbefore referred to. In an evaporator such as embodies my present invention, in which I eliminate static head and therefore reduce the storage capacity of the several effects, the factor of keeping the heating surfaces of the tubes wet with the liquor to be evaporated is of primary importance, and no commercial evaporator can be most economically operated without some provision for keeping all parts of all of the tubes wet with the liquor. Keeping the tubes wet, therefore, is another factor which must be taken into account in the construction and operation of a multiple-effect evaporative separator embodying the present invention.

*Mechanical construction.*—It is important that the mechanical construction of a commercial evaporator should be such as will ensure the optimum results when all of the foregoing factors are taken into consideration, but in addition the construction should be one in which there are no inherent weaknesses and one in which it is possible to free the tubes from any encrustations and insure the automatic operation of the entire evaporator irrespective of variations in the volume of liquor to be evaporated. In explaining the last point, when a liquor to be evaporated is of the nature of the waste blow-pit liquor in sulphite pulp manufacture, the volume of liquor may depend upon the variations in the production of pulp, due to shutting down or increasing the number of operating digesters. It becomes important, therefore, that the evaporator should be of such construction as to operate automatically within wide limits of supplied liquor without the necessity of utilizing large storage tanks with the consequent loss of heat due to such storage and increased cost of equipment.

There are liquors which may be evaporated in which there occurs a chemical change due to holding the liquors for a period of time against heated surfaces. For example, although waste sulphite liquor may be neutralized by the addition of lime, nevertheless, when held against hot surfaces for a long period of time, some of the compounds break down with the liberation of free sulphurous acid which would attack both the tubes and the shells of the evaporator. This is not a function of the concentration of the liquor but a function of the time element. Consequently, for the treatment of such liquors as herein referred to, it is important that the time required for the evaporative separation of the water from the solids should be reduced to the minimum. Therefore the construction of the evaporator should be such as to enable the treatment of the liquor in a minimum period of time. This can be accomplished in an evaporator embodying my invention, wherein the storage capacity is greatly reduced by the elimination of the static head.

In connection with the factor of mechanical construction, there is the allied factor of what I term "distribution." I have already explained under the topics "temperature difference" and "static head" that the temperature difference must be reduced to a minimum if one is to secure the most efficient operation. One of the factors heretofore which caused a rise in the temperature level was the necessity of raising the level of the liquor from one effect to the other, which was done by the excess of pressure in the first effect over the next succeeding effect. When, however, the differences of temperature are reduced to the minimum, the pressures corresponding to these differences may not, especially on the vacuum end, be sufficient to raise the liquor to the desired level in the succeeding effects. Heretofore evaporators have automatically regulated themselves in this point by increasing the temperature difference. As ordinarily the pressure necessary to raise the liquor to the required level in the next effect is a part of the total pressure, the whole of this part of the pressure should be eliminated in order to reduce so far as possible the total temperature spread throughout the entire evaporator. In the mechanical construction of the evaporator, I accomplish the desired result by utilizing means externally to the several effects for ensuring the delivery of the liquor to each effect.

There are many liquors which it is desirable to subject to evaporative separation, in which the factor of foaming is one which requires separate treatment in order to prevent the foam from passing from one effect to the next. So far as I am aware, there have been no commercial multiple-effect evaporators installed or operated in which the provision for overcoming or taking care of the foaming has not been accompanied by a loss in efficiency. In the mechanical construction of an evaporator embodying the present invention, it is possible to obviate the difficulties heretofore met with, due to the foaming of the liquors, without suffering a loss in efficiency. This is by reason of the fact, as will be explained, that the conducting surfaces may be of maximum length and may be provided with a minimum capacity for liquor and a maximum capacity of surface for liberating steam when the surfaces are wetted. By this construction, it is possible for the steam to be immediately liberated without traversing any volume of liquor, which has the effect of further reducing the temperature spread of the entire evaporator as it reduces the resistance to the liberation of the steam or the weight of the liquor necessarily lifted as the steam passes through it.

*Number of effects.*—If it were possible to evaporate liquid without temperature difference between the heating and heated media, there would be no limit to the number of effects which might be economically employed, but, owing to the fact that heat cannot be transmitted without differences in temperature between the heating and the heated media, one is necessarily limited to the number of effects that can be employed;—first, by the total temperature spread which is available; second, by the temperature differences between the individual effects; and, third, by the decrease in economy of adding such effects. A limit in the number of effects is reached in which the resulting economy does not pay for the maintenance, depreciation, interest on investment, repairs and labor involved. By decreasing the temperature spread, the efficiency to a certain extent may be increased by adding to the number of effects, and this is limited by the fact that the heat conductivity also decreases with the decrease in temperature difference, and with each liquor there is a certain point below which one cannot decrease the temperature difference without enormously increasing the investment,—thereby more than offsetting the advantages obtained by reducing the temperature difference. Therefore, in determining the number of effects to be employed, one must take into consideration not only the total temperature spread but the heat conductivity for each individual solution under consideration and each solution under different degrees of concentration.

My invention comprises a multiple-effect evaporator and a process of evaporation in which the factors hereinbefore referred to are taken into due consideration, as a result of which I am able to secure the evaporative separation of a solution with efficiency and with marked economy.

For the purpose of eliminating static head in the several effects and thereby enabling me to reduce the temperature difference in each effect and the temperature spread throughout the entire number of effects, I may employ as each effect a combined condenser and evaporator in which the tubes are substantially horizontally arranged, and, by external means, project the liquor to be evaporated in the form of a spray uniformly distributed so that substantially the same amount of the liquor enters the various tubes. This is accomplished by locating a spraying nozzle in the rear end of the effect and forcing the liquor by pumps, one for each effect, into the nozzle. The effects are preferably so arranged that the tubes are very slightly inclined from the horizontal, so that the tubes will drain in the direction of normal flow of the liquor. The unevaporated portion of the liquor is collected at the front end of the shell and is pumped thence to the spraying nozzle in the next succeeding effect into which the liquor must be introduced. The steam, which is formed in the tubes, passes around a baffle plate and from the end of the shell to the next succeeding effect. The flow of the concentrated liquor from each effect into the next succeeding effect is controlled automatically by a suitable float valve, the float of which is controlled by the level of the liquor in the last-mentioned effect. Instead of having the float valve located in the shell of the effect, a communicating well is arranged immediately below it, since there is to be no static head in the effect, and the float valve is located in a tank which communicates with the well. The concentrated liquor, in passing from one effect to another, does not, in point of fact, pass through the tank in which the float is located, the liquor in the float tank serving merely to control by its level the flow of liquor from one effect to the next effect.

Another feature of the invention is the provision for preliminarily heating the entering liquor before it is delivered to whatever effect is selected for its reception. In the particular embodiment of the invention as I have illustrated it upon the accompanying drawings, to which reference will be subsequently made, I employ ten effects, which, starting with the pressure end of the steam line, may be numbered I. to X. successively. In carrying out mixed evaporation which I have hereinbefore considered briefly, the liquor may be first introduced into effect VI., but, before being delivered to the spray nozzle in such effect, heat is imparted thereto from the mixed air and steam eliminated from effects I. to VI. inclusive. Thus I am able to increase the temperature of the entering liquor to the desired temperature corresponding to the effect into which it is to be introduced and at the same time am able to condense such steam as may be eliminated from the various effects with the air passing therefrom, without passing the air from any one effect to the other effects. Assuming that the liquor has been introduced initially into effect VI., it passes in countercurrent flow to the steam line successively from effect VI. to effect I., and then it passes to effect VII., and thence through effects VIII., IX. and X. in the sequence mentioned. Inasmuch as the liquor becomes increasingly concentrated and correspondingly smaller in volume, I provide for recirculating the liquor through certain of the second series of effects to ensure that the tubes thereof are sufficiently wetted with the liquor but without interfering with the proper flow of liquor from each effect to the next succeeding effect. In fact, provision may be made for recirculating the liquor through any of the effects as may be found desirable, this being dependent upon the nature of the liquor undergoing evaporative separation.

Provision is made for the proper transfer from each effect to the next effect of the water of condensation or drip. The flow of the drip is controlled by the utilization of float valves and wells not dissimilar to those which are utilized in controlling the flow of the liquor undergoing evaporation and concentration. From the last effect, the flow of the drip is automatically controlled by a float valve but the valve itself operates in a manner opposite to that of the remaining valves, as will be explained more in detail in the accompanying specification.

Referring to the drawings,—

Figure 1 represents more or less conventionally and diagrammatically a plan view of a multiple-effect evaporator embodying my invention.

Figure 2 represents a front elevation of the same.

Figure 3 represents a section on the line 3—3 of Figure 1.

Figure 4 represents a longitudinal vertical section through one of the effects.

Figure 5 represents, on a larger scale, a portion of the tube plate at the rear end of one of the effects.

Figure 6 represents a section on the line 6—6 of Figure 5.

Figure 7 represents a vertical longitudinal section through a part of one of the heat exchangers which is utilized in the evaporator.

Figure 8 represents a cross section on the line 8—8 of Figure 7.

Figure 9 represents a section through one of the valves and its associated float tank.

Figure 10 represents another form of valve.

Figure 11 illustrates one of the condensers utilized for condensing steam escaping with air from the effects.

Figure 12 illustrates one of the spray nozzles.

Figure 13 shows the two charts hereinbefore referred to.

Before describing in detail the multiple-effect evaporator which I have illustrated upon the drawings thus briefly referred to, I wish to have it clearly understood that the drawings are largely conventional and diagrammatic, due to the difficulty of illustrating such a large apparatus in the small space permitted by the size of the drawings, and that I have not attempted to show the parts in their relative sizes; that the phraseology which I have employed is for the purpose of description rather than of limitation; and that the invention as defined in the claims is capable of a variety of embodiments which will suggest themselves to persons skilled in the art.

I employ the term "multiple-effect evaporator" as indicating the whole number of components which are necessary for multiple-effect evaporation, and each combined evaporator and condenser I refer to as an "effect" in acordance with the common usage of the word by evaporator engineers.

Each effect necessarily comprises a shell with conductor walls separating the heating and the heated media. In an effect, or combined evaporator and condenser embodying my invention, the conductor walls consist of substantially horizontally arranged tubes (preferably slightly inclined), the ends of which are set in sheets or plates so that the heating medium or steam passes around the tubes and the heated medium or liquor passes through the tubes. The main steam line is a sectional pipe to which steam at the proper pressure is delivered at one end, the other end of the line being connected with a vacuum pump. The sections of this line are so constructed that the steam, formed in the tubes of the effects from the liquor to be evaporated and concentrated, is delivered to the next effect to pass around the conductor tubes therein. Of course the steam line may be so constructed as to permit any of the effects to be by-passed, when desired, by any of the ordinary valves or devices commonly utilized for this purpose.

I have made reference to the fact that I may practice the process of evaporative separation using, as the liquor to be evaporated and concentrated, the waste blow-pit liquor resulting from the digestion of pulp by the sulphite process; and I shall describe more or less in detail the effect upon such liquor as it is progressively evaporated and concentrated. It will be understood, however, that the apparatus and the process may be employed for the treatment of many different liquors or solutions, the various steps of the process and the temperature differences, etc., being determined or regulated by the character of the liquor undergoing treatment. Assuming, however, that the process and apparatus are employed for the evaporation and concentration of waste sulphite liquor to a degree of concentration in which the concentrated liquor is of the proper consistency for final evaporation and combustion and the recovery of the contained mineral content as described in Letters Patent No. 1,326,414, dated December 30, 1919, to John T. Quinn and myself, it may be assumed that the initial waste liquor, when withdrawn from the blow-pits or storage tanks, is at a temperature below the boiling point thereof. Since the number of the effect into which the liquor is initially delivered (i. e. whether effect V., VI., or VII.) depends upon the initial temperature of the liquor to be treated and the difference of exchange,—it may be assumed that the liquor is delivered for treatment at a temperature of about 160° F.

Before proceeding to describe the arrangement of the effects, I will first describe one of the effects and the method of delivering the liquor thereto in the form of a spray. Referring to sheet 3 of the drawings and particularly to Figures 4, 5 and 6, one of the effects is illustrated in Figure 4, it being substantially identical with all of the other effects. This effect or instrumentality, which, to distinguish it from the multiple-effect evaporator as a whole, may be defined a combined evaporator and condenser, consists of a cylindrical shell indicated as a whole at 20. This shell consists of a plurality of tubular sections which overlap each other and are properly riveted or otherwise joined together. Within the shell are arranged the tube sheets 21, 22, 23, in which are arranged what I term the horizontal tubes 24. At the rear end there is a head 25 and at the front end there is the head 26. These heads are suitably connected to the ends of the cylindrical shell and afford chambers 27, 28, the former, at the rear end, for the entering liquor and the latter for receiving the steam and the concentrated liquor resulting from the evaporative process carried on in the tubes. Each effect is preferably inclined slightly to the horizontal from the rear end to the front end. Each of these instrumentalities may be of any desired length; and, as the tubes may be of such length as to cause a tendency to sag between their ends, I employ one or more of the intermediate tube sheets, as at 23, for supporting the tubes between their ends. The steam chamber within the shell,—bounded by the cylindrical wall of the shell and by the tube sheets 21, 22,—which receives the steam for heating the liquor passing through the tubes in an instrumentality of considerable length, is divided by the intermediate tube sheet, 23, but the separate compartments thus formed may be connected by a U-trap to permit the water of condensation to flow from one of the compartments to the other, although it is quite evident that the intermediate tube sheet may be formed with a plurality of apertures to permit the passage of steam and water of condensation from one of the compartments to the other. The condensed water or drip from the steam chamber 30 passes from the front end thereof into a depending well indicated at 31. Steam is admitted into the chamber through two or more inlets 32 located at the top of the shell. For the emission of steam and entrained air from the steam chamber, there are a plurality of outlets 33, leading from the top of the shell. It is evident that, by increasing or decreasing the number of the sections of the shell, each effect may be made of any desired length. In fact, when once installed, the effect may be lengthened by removing the head 27 and adding one or more shell sections and adding tube sections accordingly.

The liquor is introduced into the rear head 27 through a nozzle indicated at 34, so located and constructed that the liquor will be sprayed uniformly into all of the tubes of the effect. The liquor is delivered under pressure from a pump to the nozzle to secure the proper spraying effect. In order to assist in the equal distribution of the spray into all of the tubes, I provide the tube sheet 21 with a series of troughs, each trough being formed of an angle plate 35 secured by fastenings 36 to the outer face of the tube sheet 21 (see Figures 5 and 6). The troughs or plates near the bottom rows of tubes may be lengthened so as to catch any spray which falls a little short of the tube sheet. Inasmuch as the ends of the tubes are necessarily separated, it is apparent that, without the provision of the troughs, a large part of the spray would strike the face of the tube sheet and fall to the bottom of the shell. By the provision of the troughs, however, the spray is caught in approximately horizontal zones, as it were, and delivered into the ends of the tubes in the respective zones. In the head 26 at the front end of the effect and within the chamber 28, there is placed an inclined baffle plate 37 which extends entirely across the chamber so as to be engaged by the liquor entrained with the steam in passing out of the tubes so that the concentrated liquor will be deflected downwardly so as to pass from the head chamber 28 into the well indicated at 38. Since this liquor is in the form of a very fine spray or droplets, in some cases in particles like a mist, their impingement upon the baffle plate tends to condense them and to deflect them downwardly towards the well 38, the steam passing around the baffle plate and emerging from the head 26 through the outlet 39, whence it passes to the next effect as will be described. The two removable heads 25, 26, are provided with manholes 40, 40, through which one may gain entrance into the chambers within the heads for making minor repairs, and the head 26 may be provided with a glazed peephole 41.

The well 38 depends from the head 26 and receives the concentrated liquor emerging from the tubes 24. The liquor passes from the lower end of the well through an outlet 42 to a pump, to be described, so that it may be delivered under pressure to the nozzle of the next effect. There is, however, a pool of liquor always contained in the well 38 and the height of the liquor in such well determines the flow of liquor delivered to the nozzle 34 of the same effect. Consequently, as will be explained, the introduction of liquor into each effect is determined by the accumulation of the liquor in the well of that effect. Therefore I am able to secure an automatic control, which, as I have pointed out, is one of the highly desirable and essential factors in multiple-effect evaporation when carried out according to my process.

This automatic control is secured by a float valve, the position of the float of which depends upon the level of liquor in the well 38. By the side of each well, I locate a tank 43, one of these tanks and the adjacent mechanism being shown in Figure 9. The tank and the well are connected by the pipes 44, 45, so that the liquor will be at the same time level in both. The tank may be of any ordinary construction, but I have shown it as provided with a removable head 46 so that access may be had to the float located in the tank. The tank is provided with an exterior gage glass 47 for showing the height of the liquor contained therein. There is an aperture 48 in the side of the tank to which is secured a fitting 49 which supports a valve mechanism. This valve mechanism comprises a body or casing 50 provided with two ports 51 vertically spaced as shown, and with a port 52. According to the location of the valve mechanism, the ports 51 may be either inlet or outlet ports, and the port 52 may be either an outlet or an inlet port, as the case may be. As a matter of construction, the valve mechanism is provided with two ports 52 arranged opposite each other, one of which is closed by a cover plate. Between the ports 51, 51 and above and below the port 52, the valve casing is provided with two cross webs or partitions 53, 53 which are centrally apertured and upon which are secured the valve seats 54, 54. The valve seats may have apertures of the desired diameter and may be secured either to the upper faces or to the lower faces of the partitions or cross webs 53 according to the location and use of the valve mechanism. In the form shown in Figure 9, the valves 55, 55, for cooperation with the seats, are adjustably secured upon a stem 56 sliding at its lower end in a bushing 57 and passing at its upper end through a stuffing box or gland 58 in the lower portion of the fitting 49. The upper end of the valve stem is connected by a link 59 with a float lever 60 fulcrumed upon a rod 61 and passing into the chamber within the tank 43. The inner end of the float lever is secured to the buoyant bell or float 62. From this construction, it will be observed that the height of the liquor in the tank 43 determines the position of the valves 55 in reference to their respective seats 54, and thus controls the flow of the liquor through the valve chamber. According to the arrangement shown, as the float 62 drops due to a lowering of the level of the liquor in the tank 43, the valves are raised; and that, when the liquor rises sufficiently, the valves are closed. The two ports 51 communicate with a Y-shaped fitting or coupling 63.

The provision of a valve mechanism, such as herein described, having ports 51, 51 and 52 with valves and valve seats located between the port 52 and the ports 51 or its equivalent, is essential since the valve mechanism is balanced against varying pressures, since any pressure operating to lift one valve 55 is counteracted by pressure tending to close the other valve. In Figure 10, I have shown the valves 55 and the valve seats 54 as being located below the cross webs or partitions 53 in the valve casing, so that with this arrangement the downward movement of the float tends to close the valve casing to the passage of liquor therethrough, this arrangement being especially applicable for the discharge of the condensed water or drip from the last effect. In this connection, I may state that substantially the same arrangement of parts as shown in Figure 9 is utilized for controlling the flow of the water of condensation from one effect to the next effect.

I desire to call attention to one important advantage of the mechanism utilized to control the flow of liquor into the effect, and that is that the float is located in the tank separate from the valve casing so that the liquor does not flow through the chamber in which the float is located. Consequently there is no tendency for any foaming of liquor such as to affect the proper operation of the valves. While liquor to some extent flows into and out of the float-containing tank, nevertheless the amount of liquor so flowing is negligible, and the heat of the liquor in the tank is largely dissipated by radiation, so that there is practically no tendency for the liquor to foam therein. If the liquor passing from one effect to another were caused to pass through the float tank, the difference in temperature between the entering liquor and the liquor in the tank would, under certain conditions, cause the entering liquor to foam and to interfere with the proper operation of the valves. This is all obviated by the construction in which the liquor, passing from one effect to the next, does not enter the valve tank but passes through a valve mechanism which is separate from the float tank, but which valve mechanism is controlled by the height of the liquor in the tank, the height of such liquor being controlled in turn by the height of the liquor in the well at the bottom of the effect.

Referring now to Sheet 1 of the drawings and to Figures 1 and 2 thereon, a multiple-effect evaporator is shown comprising ten effects numbered I. to X. inclusive. Each of these effects, except for minor unimportant details, is identical with that shown in Figure 4. Above these effects, there is the steam line 64, to the pressure end 65 of which steam is delivered at the desired pressure from a suitable boiler. The opposite or vacuum end 66 of the steam line is connected with a condenser and a vacuum pump indicated conventionally at 67, 68. This steam line is formed in sections, so that steam can be conducted to the steam chamber of each effect from the steam line, and steam generated in the tubes therein conducted from the front end of the effect back to the steam line and thence to the steam chamber of the next effect. As a matter of convenience in piping, the pressure end 65 of the steam line is provided with a branch 69 communicating with the inlets 32, 32 of effect I., there being a valve at 70 so that effect I. may be by-passed if desired. In fact, similar valves may be used throughout the steam line to by-pass any number of effects that may be desired; or, in lieu of valves, their equivalents such as closed or open couplings may be introduced into the line. From the steam line, a branch 71 leads to the inlets 32 of each effect so that the steam generated from the liquor in each effect may be transmitted to the steam chamber of the next succeeding effect and thus in sequence from effect I. to effect X. inclusive. Naturally the steam line and the branches 71 increase in diameter as one approaches the vacuum end of the steam line, due not only to the greater volume for a given weight of steam but also due to the greater weight of steam, progressively from the pressure end to the vacuum end of the evaporator. Under the assumption that sulphite liquor is being evaporated and enters effect VI. in the series at a temperature of 172° F. as will be explained, I maintain a steam pressure at the pressure end of the steam line of about 38 pounds and I maintain a vacuum in the condenser 67 of about 28 inches mercury.

The liquor to be treated is delivered from the blow-pit or from a storage tank to a pipe 72, through which it is pumped by a pump 73 to a series of heat exchangers or condensers 74. In order to avoid confusion, I have indicated the pipe 72 by the same numeral throughout its length until it reaches the Y-coupling 63 of the valve of effect VI. After passing through the valve mechanism, the liquor traverses a pipe 75 to the spray nozzle 34 (see Figure 4) of effect VI. There is one heat exchanger and condenser 74 associated with each of the effects from I. to VI. inclusive, and the initial liquor to be evaporated passes through the heat exchangers and condensers in inverse order so as to be heated by the heat of the air and entrained steam issuing from the top of effects VI. to I. inclusive. To distinguish the instrumentalities indicated at 74 from other heat exchangers which I employ in my apparatus, those at 74 may be referred to as the "air entrainment exchangers". I have already called attention to the fact that leading from the top of each effect are the outlets 33, 33 (see Figure 1) for the steam and the entrained air, and these outlets in effects I. to X. inclusive are connected to a pipe 76. Since there are two outlets 33 for each effect, there are a series of branch pipes 77 extending from the rear outlets 33 to the pipe 76. There are six air entrainment exchangers 74 associated with effects I. to VI. inclusive, and the air pipe 76 is so branched and valved that the steam and entrained air from each of effects I. to VI. inclusive will be caused to pass into the associated air entrainment exchanger 74, so that the steam will be condensed therein and the heat thereof transferred to the liquor passing through such exchanger, these branches being indicated at 78 and the valves at 79. The air is discharged through outlets 80 into the atmosphere or into a pipe not shown, where there is a positive gage pressure as may occur in effects I. to V. inclusive. Where there is a minus gage pressure (by which I mean below that of the atmosphere) in any one of the evaporators, as effect VI. for example, that air is not discharged into the atmosphere but is carried back to the air pipe 76. In the illustrated embodiment of the invention in Figures 1 an 2, there is no air entrainment exchanger for effects VII. to X. inclusive, but the steam and entrained air pass through sections of the pipe 76 to the steam chambers of the successive effects in the order named and finally through the condenser. The air line is so constructed and valved that the air entrainment exchangers may be by-passed to cause the steam and the entrained air to pass from the steam chamber of one effect to the steam chamber of the next succeeding effect from effects I. to X. inclusive. Inasmuch as this is merely a matter of proper valves and piping, it is not necessary to complicate the necessarily small drawings by the addition of the valves and pipes, although they are shown to a certain extent in Figure 3. By the employment of the air entrainment exchangers, however, which operate as condensers for the steam issuing from the top of the steam chambers of certain of the effects, it is possible to condense such steam and to prevent the air from passing from one effect to the next effect. The drip from the lower end of each of the exchangers 74 may flow to a trap. I have illustrated one of these exchangers in Figure 11, in which the shell of the exchanger is indicated at 81, the tube sheets at 82, the inlet and outlet for the liquor at 84 and 85 respectively, the inlet for the mixed steam and air at 86, the outlet for the air at 87, and the outlet for the drip at 88.

Returning once more to the sulphite liquor to be evaporated, it may be stated that in passing through the series of entrained air exchangers 74, it is heated to a temperature of approximately 172° F., and it is at this temperature when it enters the spray chamber at the rear end of effect VI. In passing through the tubes of that effect, a part of the water is evaporated as steam and passes through the proper section of the steam line 66 to the steam chamber of effect VII. The unevaporated liquor, however, which collects in the well of effect VI., passes downwardly through a pipe 90 to a pump 91, thence through the valve mechanism associated with effect V., and is sprayed into the spray chamber of effect V. In the same way, the unevaporated liquor collecting in the well of effect V. is pumped into the spray chamber of effect IV., and so on until it is finally sprayed into the spray chamber of effect I. Thus the liquor is in countercurrent flow to the steam from effects VI. to I., the steam passing from one effect to the other in the order of effects I. to VI. inclusive. Inasmuch, however, as the steam is of a higher temperature at the pressure end of the steam line and is progressively higher in temperature in effects VI. to I. inclusive, the liquor in its flow is subjected to progressively increasing temperatures. As the liquor in its flow from effect VI. to effect I, is progressively concentrated, and would ordinarily increase in viscosity, yet, inasmuch as it is subjected to progressively increasing temperatures, the tendency towards increased viscosity is neutralized. This is one of the important features of the present invention, as pointed out in the initial part of this specification. The flow of the liquor from effect to effect is controlled automatically, as previously stated, by the float valve mechanism according to the height of the liquor in the wells of the several effects.

As the liquor is being pumped from the well of one effect to the spray nozzle of the next succeeding effect, in effects VI. to I. inclusive, it is caused to pass through heat exchangers which are indicated conventionally at 92, 93, 94, 95, 96, 97, 98, 99, 100, 101 and 102. From the well 38 of effect I., the liquor is carried through the heat exchangers 102 to 92 inclusive in series, and emerges through pipe 103 from heat exchanger 92. The heat exchanger 92 is utilized for additionally heating the entering liquor as it passes through pipe 72 to the float-valve mechanism of effect VI. The remaining pairs of heat exchangers 93, 94; 95, 96; 97, 98; 99, 100, and 101, 102 are utilized for heating the liquor as it passes from the wells of the effects VI. to I. inclusive, in the order named. Each heat exchanger consists of an elongated cylindrical shell 104 (see Figure 7) having tubes 105 for the liquor passing from effects VI. to V., or effects V. to IV., and so on from effects II. to I. Inasmuch as these heat exchangers are of great length, they may be divided into sections with intermediate partitions 1103 or tube sheets, and in such case each heat exchanger may be provided with a by-pass 106 around such intermediate tube sheets, as shown in Figure 7. One of the important advantages secured by the use of the heat exchangers 92 to 102 inclusive, is to transfer the heat as much as possible towards effect I. so as to secure economy in heat by its reuse to the greatest possible extent. Since it may be necessary to by-pass effect I. and its associated mechanism, I provide a by-pass from the well 38 to effect II., as indicated at 107, so that the liquor from the well may be transferred for passage through the heat exchangers. In Figure 2 of the drawings, the liquor from the bottom of well 38 from effect I. passes through pipe 109 to heat exchanger 102, and the various heat exchangers are connected by pipes 110, 111, in order to permit the liquor on its way from effect I. to pipe 103 to pass through the heat exchangers in series. The effect of this is not only to utilize the heat in raising the temperature of the liquor in passing through the effects VI. to I. inclusive, but also to lower the temperature of the partially concentrated liquor delivered from effect I. on its way to the remaining effects VII. to X. inclusive.

The partially concentrated liquor, after being cooled by its passage through the heat exchangers 102 to 92 in the order named, is now forced from the pipe 103 by a pump 112 to the spray nozle in effect VII., its delivery to such nozzle being controlled by the height of the liquor in the well 38 of said effect by float-valve mechanism similar to that described in connection with the other effects. The partially concentrated liquor from said effect VII. passes from the well through pipe 113 to a pump 114 and thence to the spray nozzle of effect VIII. Similarly from effect VIII. concentrated liquor is forced by pressure of a pump 115 through pipe 116 to effect IX., and from the well of effect IX, the liquor is pumped by a pump 117 through pipe 118 to the nozzle of effect X. According to this arrangement, the liquor and the steam flow in the same direction through effects VII. to X. inclusive. This unavoidably results in an increase in the viscosity of the liquor with the decreasing temperatures of the liquor, but this is offset by an economy in the conservation in the heat of the liquor which otherwise would be wasted in the condenser 67. As the liquor decreases in volume due to its concentration, and as the result of its concentration is to decrease its foaming capacity, and as the effects are all of the same size,—a point would be reached at which there would be insufficient liquor in the conductor tubes of certain of the effects to ensure the wetting of the interior surfaces of the tubes by the liquor passing therethrough. Consequently I find it desirable and in fact in some cases necessary to provide for a recirculation of the liquor through the tubes of such effects. In Figure 2, I have shown effects IX. and X. as provided with means for causing such recirculation. Such means comprise a pipe 119 leading from the well 38 of each of the effects, a pump 120 and a pipe 121 extending from the delivery end of such pump and connected to the nozzle of the effect or to the pipe leading to said nozzle. From the circulating pipe 121 of effect X., the final delivery pipe 122 (which is provided with a hand-manipulated valve 123) may lead to a storage tank for the concentrated liquor.

In the steam chamber of each of the effects, the steam is condensed and provision must be made for transferring such condensed steam or drip through the series of effects from effects I. to X. inclusive. As will be recalled, each effect near its front end is provided with a well 31 for the drip or condensed steam, as shown in detail in Figure 4, located at a point between the end tube sheets 22, 21 and adjacent the front head end of the effect. In Figure 3 (which is a cross section on the line 3—3 of Figure 1) I have shown a drip drain line or pipe indicated as a whole at 124 formed in discontinuous sections. The drip passes from each effect through a section of this drain line to the steam chamber of the next succeeding effect. Adjacent each well or drip pocket 31 there is a float tank 125 and a valve mechanism 126 substantially similar to those shown in Figure 9, as previously described. The inlet ports of the valve 126 are connected to the drain line section by a pipe 127 and a pipe 128 connects the outlet of such valve to the steam chamber of the next succeeding effect, so that the water of condensation passing the drip pocket of one effect, on entering the steam chamber of the next succeeding effect, is formed into steam. The water of condensation passes back from the drip pocket 31 of the effect through a pipe 129 to the drain line. The drain line 124 and the pipes 127, 129 are provided with manually-operated valves 130, 131, 132, those at 132 serving to divide the drain line into discontinuous sections when all of the effects are in operation, assuming, of course, that such valves are at this time closed. By opening a valve 132 and closing the valves 130, 131 of any effect, such effect may be by-passed as far as the condensed steam is concerned. I have already explained that any of the effects may be by-passed in respect of the liquor, steam, and entrained air and steam. At effect X. there is an additional float tank 133 and valve mechanism 134 to control the delivery of condensed steam from the drip pocket 31 of such effect to a tank 135 in which the water of condensation from all of the effects is collected and from which it may be pumped to storage. The arrangement of the valves in the valve mechanism 133 is that shown in Figure 10, in which the valve stem 56 is provided with valves 55 located below the valve seats 54, so that, when the float is raised by an accumulation of drip in the drip pocket of effect X., the valves are opened to permit the discharge of the condensed steam. From this description, it will be apparent that, not only is the flow of liquor into each effect automatically controlled, but the transfer of condensed steam from effect to effect is likewise automatically controlled. It will be understood that, in the construction of a multiple-effect evaporator embodying the invention, the pumps 91, 112, 114, 115, 117 and 120, which deliver the liquor under pressure to each evaporator, should be located at some distance below the level of the wells of the effects. This distance should be such as to give a positive gage pressure at the intake of the pumps, and, since I maintain at the vacuum end of the multiple-effect evaporator an absolute pressure of only 2 (28 inches mercury at barometric pressure of 30°), the pump should be located for the evaporation of water at least 34 feet below the level of the well. This distance, however, may be changed according to the specific gravity of the solution undergoing evaporation.

When my process and apparatus are practiced and employed in the concentration of waste sulphite liquor which enters the initial supply pipe 72 at a temperature of 160° F. and is delivered to effect VI., at a temperature of 172° F., the concentrated liquor delivered from pipe 122 for storage is at a temperature of approximately 110° F.; and, whereas the original liquor contains about 6% solids, the concentrated liquor contains from 46% to 50% solids. This evaporation and concentration is accomplished at the rate of 11.2 pounds of water per pound of steam,—a result which, so far as I know, has never been before accomplished in any commercial apparatus. In fact, so far as I am aware, I accomplish the evaporation of water per pound of steam at more than double that which has ever before been commercially accomplished. That I am able to effect such economy is due to the construction and arrangement of the apparatus herein described and to the observance of the various factors which I have hereinbefore stated. In the multiple-effect evaporator, as hereinbefore stated, there is no static head in any one of the effects. The liquor is pumped under pressure and is sprayed into the receiving chamber of the effect and distributed into the numerous tubes, so that, as soon as the liquor reaches the tubes, steam is generated and the tubes are filled with a mass of foam wetting the entire interior surfaces of the tubes. The slight pressure thus generated assists in forcing this mass at high velocity through the tubes due to the low resistance to the passage of the mass. The steam, therefore, does not have to pass upwardly through or lift any considerable body of the liquor, as in the commercial evaporators wherein a static head is employed. Consequently in my process, as the heat conductivity is greatly increased, the temperature difference may be markedly reduced. Instead of causing the steam to subdivide the liquor by passing upwardly through the liquor as in multiple-effect evaporators as heretofore considered, I subdivide the liquor initially by spraying it into tubes by mechanical means such as the pumps which I employ. This further assists in reducing the temperature difference. The accumulative effect therefore is to reduce the temperature spread of the entire evaporator. In an evaporator, such as illustrated on the drawings, it may have its component effects, for example, 12 feet in diameter, the tubes of which are 30 feet in length. Consequently the provision of the mechanically-operated pumps for conveying the liquor from each effect to the next succeeding effect and spraying it therein eliminates the necessity of a temperature difference between the several effects necessary to secure the pressures to raise the liquor to a height of at least 12 feet. While I make reference to the size of the effects for the purpose of illustration, it will be understood, of course, that I do not limit myself to any particular dimensions so far as the individual effects are concerned, the diameters of the effects being controlled by the volume of liquor to be evaporatively separated. It is important to note, however, that I am able to secure a very great conductor surface in the effects by increasing the length of the tubes. Furthermore the conducting surface area in each effect may be increased by increasing the diameter of the shell and the number of the tubes, inasmuch as the liquor is supplied by mechanical means exterior to the effects. Therefore this makes it possible to provide a safe mechanical structure without incurring prohibitive costs in the construction.

For the purpose of illustrating the coefficient of heat conductivity from steam to boiling waste sulphite liquor of various concentrations at various temperature levels and various temperature differences between the heated steam and the boiling liquor, when no hydrostatic head on the liquor occurs in the effects, and with such facilities as are secured by the construction of the effects as illustrated and hereinbefore described, I have shown on the accompanying drawings in Figure 13 two charts which are self-explanatory. The coefficient of heat conductivity is plotted against temperature difference in degrees Fahrenheit for four liquors of varied concentration, namely, 10%, 20%, 30% and 40% solids. The temperature levels, namely the boiling point of the liquid at its surface, are indicated by the various curves. It will be observed that the heat conductivity increases with the temperature level of the various liquors and also increases with the temperature difference, but decreases with the concentration.

It is of importance that the foam generated in the conductor tubes of one effect should not be transferred to the steam space of the next succeeding effect. This is accomplished to the best advantage, according to my invention, in addition to eliminating the static head and employing external means for delivering the liquor in the form of spray to the tubes, by utilizing substantially horizontal tubes which may be of any length desired, and which afford a maximum conducting surface for the heat exchange. By increasing the length of the horizontal tubes, the area of the surface of the liquor, from which foam is liberated, may be correspondingly increased. If the tubes were vertical, the foam-liberating area of the liquor would be equal only to the combined cross-sectional areas of all of the tubes. But, by having the tubes horizontal, the foam-liberating surface of the liquor is greatly increased in area, the area being equal to the diameter of the tubes multiplied by the length of the tubes multiplied by the number of the tubes. The foam formed in the tubes makes contact with the upper interior conducting surfaces of the tubes, and such surfaces, being constantly wet, transfer heat to the films of foaming liquor and convert the liquor into steam, and, as the surfaces are consequently kept wet, there is a minimum tendency for the incrustation of such surfaces with the solids contained in the liquid. Thus I provide a maximum area of liquor surface for the formation of foam, and a maximum area of conducting surface for contact with the foam. By the conversion of the foam films into steam and the consequent increase in volume of steam, the velocity of the total steam and residual liquor from the rear ends to the front ends of the tubes is increased sufficiently to cause the disruption of the films and disintegration or dissipation of the foam. The final disintegration may be due to the fact that the pressure in the tubes is slightly greater than that in the chamber is slightly greater than that in the chamber 28, so that the bubbles emerging into the chamber from the tubes tend to expand suddenly and break. In any event, however, irrespective of theories to account therefor, no foam is carried from one effect to the steam chamber of the next effect. While, by reason of arranging the tubes substantially horizontally, I am able to secure the results just stated with a minimum temperature difference between the heating and the heated media, nevertheless I would not consider it a departure from my invention if the liquor were sprayed into vertical or sharply inclined tubes, although there would be a loss in efficiency in so doing.

In describing the operation of the multiple-effect evaporator in the treatment of waste sulphite liquor, I have pointed out that the liquor is caused to enter effect VI., prior to which its temperature is raised by heat from the steam and entrained air liberated from the steam chambers of effects I. to VI.; and that, after passing through the effects in a direction opposite the flow of the steam, the liquor is then caused to pass through effects VII. to X. inclusive in the same direction as the flow of steam. Of course, it is not essential that the liquor should be initially introduced into effect VI. only, as it could be introduced equally well into any one of the intermediate effects depending upon its initial temperature. In other words, the liquor to be evaporatively separated is introduced into that effect wherein the boiling point of the liquor is substantially equal to or just above the boiling point of the entering liquor. With ten effects and with the entering sulphite liquor at a temperature of 172° F., the liquor in the specific embodiment of the invention herein described is therefore introduced into effect VI. because in that effect the boiling point of the liquor is 172° F. If, for example, the liquor at 172° F. should be entered into effect X. and caused to traverse the effects in reverse order to effect I., the sensible heat in this liquor above 100° F. would be dissipated in the condenser. More specifically, assuming that 16,000,000 pounds of liquor per day were to be passed through the multiple-effect evaporator, then under the circumstances stated 1,182,000 pounds of steam would pass into the condenser and its heat would be lost. When, however, the liquor at the temperature indicated is caused to enter effect VI., it is nearer the boiling point of the liquor in effect I. by 72 degrees, and therefore no additional heat is necessary to raise the temperature of the liquor 72 degrees. On leaving effect I., the temperature of the liquor is approximately from 230° F.

to 270° F., according to the varying volume of the liquor treated per day, it being assumed that the average volume of liquor is approximately 16,000,000 pounds per day. As this liquor is conducted to effect VII., it passes through the heat exchangers 102 to 92 inclusive and is delivered at a temperature of approximately 180°–182° F., so that a part of it will form steam immediately on entering the recovery end of effect VII. and before coming in contact with the tubes. Were it not for the heat exchangers, the liquor would enter effect VII. at a very much higher temperature than the boiling point of the liquor therein, and its heat would be utilized only in effects VII. to X. inclusive; but, by utilizing the excess heat of the liquor which passes from effect I. to effect VII., in heating the liquor successively from effect VI. to effect I., there is a greater conservation of heat since less steam is necessary to heat the liquor in the several effects from VI. to I. inclusive. Under the conditions, however, as herein stated in the treatment of waste sulphite liquor, after the liquor once leaves effect I., it becomes necessary to conserve both the heat added to the liquor in reaching effect I. and the sensible heat in the liquor as originally delivered from the storage tanks. The heat added to the original liquor is conserved through the heat exchangers. The sensible heat in the initial liquor, as it came from the storage tank, is conserved by entering it into that unused effect, the boiling point of the liquor of which is nearest the temperature of the original liquor. It is evident that, by this arrangement, I accomplish the reuse of this heat in the most efficient manner by following, from effect VII. through effect X., ordinary principles of forward multiple-effect evaporation and accomplish an evaporative separation of considerably more than twice that which would be obtained were the liquor entered into effect X. and caused to flow backwardly to effect VII.

I have heretofore discussed the necessity of increasing the temperature of the liquor as its concentration and viscosity increase. Were I to follow this principle in the evaporative separation occurring after the liquor leaves the heat exchangers, without regard to temperature, I would provide for delivering such liquor in effect X. and pass it backwardly to effect VII.; but, when the temperature of such liquor is taken into consideration, it will be seen that the procedure last referred to would occasion a great loss of heat by dissipating all heat of the liquor above the boiling point in effect X. in the condenser without its reuse. Consequently the liquor is caused to enter the next effect (effect VII. in this case) in which the boiling point of the liquor therein is nearest the temperature of the entering liquor, and the reuse of the heat is accomplished as in the ordinary forward multiple-effect evaporation. Thus, since the boiling point of the liquor in effect VII. is much higher than the boiling point of the liquor in effect X., there is saved, on the discharge of the concentrated liquor from effect X., the heat represented by the difference in temperature between the liquors in effect X. and effect VII., multiplied by the number of pounds of discharged liquor, multiplied by the specific heat of the discharged liquor. A further conservation of heat is secured, as previously explained, by utilizing the steam and entrained air from the top of effects VI. to I. inclusive in heating the initial liquor on its way to the intermediate effect VI., and at the same time the air is discharged from these effects without passing from one to the other and the said steam is condensed as drip and may be conducted to any suitable place where its heat can be utilized. Theoretically this occasions a slight loss of heat; but practically, as the volume of steam so condensed is very small, no material amount of heat is actually wasted, and even this loss is more than offset by the reduction in heating surface which would be required in these effects if the air and non-condensible gases were passed from the top of the steam chamber of one effect to the steam chamber of the next effect.

In the first series of effects, namely I. to VI. inclusive, the liquor as it is progressively concentrated is subject to progressively higher temperatures in its passage from effect VI. to effect I. While at ordinary temperatures the viscosity of this liquor would increase with the increasing concentration and the conductivity would decrease with the increasing viscosity, by progressively heating this liquor as the viscosity increases I overcome this tendency to lower the heat conductivity. Referring to charts I. and II. shown in Figure 13, it will be noticed that there are constants of conductivity for solutions of waste sulphite liquor under four different degrees of concentration, namely 10% solids, 20% solids, 30% solids and 40% solids. It will be noticed that at the same temperature level the heat conductivity is the greatest for the solutions containing the least percentage of solids, and that, as the solids increase, the heat conductivity decreases as the same temperature level and the same difference of exchange. If the ordinary practice of forward multiple-effect evaporation were carried out, and the weak liquor entered effect I. instead of effect VI. as heretofore stated, the heat conductivity would be greatest in effect I. inasmuch as the temperature level would be greatest in effect I. and the percentage of solids would be least. From then on there would be a falling off of heat conductivity as the concentration of the liquor increased, as the liquor passed to effect X. This would be due to both the dropping of the temperature level and the increasing viscosity of the liquor as it became concentrated. To show that I overcome this tendency to decrease the heat conductivity as the viscosity increases (at ordinary temperatures) by increasing the temperature, I would call attention to the fact that the heat conductivity of the weakest liquor, namely in effect VI., is lower than the heat conductivity of the liquor in effect V., which in turn is lower than the heat conductivity of that in effect IV., and that the heat conductivity of the liquor progressively increases until effect I. is reached, which result is just the opposite of the conditions just outlined in the ordinary practice of forward multiple-effect evaporation. This can be readily seen if one studies charts I. and II. and exterpolates between the values of the curves shown on those charts. This factor of increasing the temperature with the increasing concentrations of the liquor tends to materially reduce the differences of exchange in each effect and consequently the total temperature spread between effects VI. and I.; and, to the extent that I am able to use this principle of increasing the temperature with the increase of concentration of liquor, I am enabled to secure a great efficiency in this portion of the evaporation. While other conditions make it impossible to carry out the same principles in the evaporation of the liquor in effects VII. to X. inclusive, still, on the other hand, as I have pointed out, by carrying on the forward multiple-effect evaporation through these last-mentioned effects, I accomplish other results which in a measure compensate for the increased temperature differences in these effects; and furthermore, as the heat conductivity decreases in the last of these series of effects, this too may be compensated for by designing the effects as to size so that sufficient conducting tube surface will be afforded in the last effect as to make up for the loss of heat conductivity. It may be observed that the heat conductivity in effect X. is less than one-third of the heat conductivity of effect I.

I have previously referred to the fact that, in the treatment of waste sulphite liquor, there is a decomposition of certain components of the liquor with the liberation of free sulphurous acid when the liquor is held for a considerable length of time in contact with heated surfaces, and that therefore the element of time is one which must be considered in the evaporative separation of such liquor so as to prevent such decomposition and the liberation or formation of the acid. In the process and apparatus as herein described, it is possible to pass the liquor at a relatively high speed through the several effects, and, even when the liquor is in effect I., wherein it is subjected to the highest temperature, the amount of water contained therein is such and the velocity of the liquor through the tubes is so great, that the solids are not decomposed; and, although the liquor in passing through the heat exchangers remains for a relatively longer time in contact with the heated surfaces, yet no concentration takes place in these exchangers and the only loss of heat is that of sensible heat, which loss is relatively small per square foot of conducting surfaces. When the liquor is passing through effects VII. to X. inclusive, where the concentration is greatest and the liquor is most susceptible to decomposition in prolonged contacts with the tubes, the increasing volume of steam, due to the reduced pressures and the increasing amount of steam, effects a great increase in the velocity of the liquor through the tubes, and decomposition is prevented. This is an additional advantage incident to the mixed evaporation.

While I have described my improved multiple-effect evaporative separator as practiced or embodied in an apparatus comprising ten effects, of course it will be appreciated that the number of effects may be decreased or increased according to the desired temperature spread and to the heat conductivity of the solution or solutions under treatment. For waste sulphite liquor, the most economical results are secured by employing a multiple-effect evaporator having ten or more effects. It is evident that, if the solution undergoing evaporative separation has a greater heat conductivity than that of sulphite liquor, the number of effects could be increased with a given temperature spread; and conversely, if the liquor has a lesser conductivity, the number of effects for a given temperature spread may be decreased from ten, unless it should be desirable to utilize greater conducting surfaces in the several effects.

In effecting the distribution of the liquor into the tubes of each effect, it is desirable that this should be secured in such way that practically the same amount of liquor enters all of the tubes of the effects. This is best accomplished by the use of one or more spraying nozzles located in the effect so as to discharge the spray uniformly into the ends of the tubes, but I do not limit myself to the use of spray nozzles as any other mechanical equivalents may be utilized, together with the external pressure means, for effecting the distribution of the liquor. I prefer to use spray nozzles having relatively large emission orifices so that the presence of pulp, scale or other foreign bodies in the liquor undergoing evaporative separation will not injuriously affect the distribution. Of course, for the best results a spray nozzle should be employed which delivers practically a solid cone of spray, such, for example, as the nozzle as illustrated in Figure 12 of the drawings. This nozzle per se is not my invention and can be purchased on the open market.

In the construction of the several effects, it is preferable to build the effects with shells of cylindrical form and of such thickness as to be capable of withstanding the collapsing pressure of the atmosphere in those effects in which there is a vacuum.

In describing the liquor as being discharged from the nozzles or distributing means, in the form of a spray, the language employed is intended to cover the discharge of liquor in such manner that it is distributed to the tubes in an amount insufficient to fill the tubes, thereby affording a large area of liquor surface for the formation of foam, and a large area of tube-conducting surface to be wetted by the foam. The unevaporated liquor in each effect flows into the pool which collects in the associated well and from which it is discharged and pumped to the next appropriate effect. Since the well is located below the level of the tubes, the tubes are never submerged, as the supply of liquor is controlled by the level of the pool in the well.

I claim:—

1. A process of multiple-effect evaporation, which comprises causing the liquor to flow from an intermediate effect in sequence through a group of progressively hotter effects, and thence in sequence through a group of effects which are progressively colder.

2. A process of multiple-effect evaporation, which comprises causing the liquor to flow from an intermediate effect in sequence through a group of progressively hotter effects, and thence in sequence through a group of effects which are progressively colder, and causing the steam generated in each effect to flow to the next succeeding colder effect throughout the entire series of effects.

3. A process of multiple-effect evaporation, which comprises causing the steam generated in each effect of a series of progressively hotter effects to generate steam from the liquor in the next hotter effect, and causing the liquor to flow from an intermediate effect backwardly through progressively hotter effects, and thence forwardly through the remaining progressively colder effects.

4. A process of multiple-effect evaporation, which comprises generating steam from the liquor in the first of a series of progressively colder effects, causing the steam generated from the liquor of each effect to flow to the next colder effect for the generation of steam from the liquor therein, causing the liquor to flow from an intermediate effect backwardly in sequence through the preceding progressively hotter effects, and thence forwardly in sequence through the remaining progressively colder effects, and causing the liquor passing from the first-mentioned group of effects to the second-mentioned group of effects to heat the liquor passing from effect to effect in the first-mentioned group of effects.

5. A process of multiple-effect evaporation, which comprises generating steam from the liquor in the first of a series of progressively colder effects, causing the steam generated from the liquor of each effect to flow to the next colder effect for the generation of steam from the liquor therein, causing the liquor to flow from an intermediate effect backwardly in sequence through the preceding progressively hotter effects, and thence forwardly in sequence through the remaining progressively colder effects, and heating the liquor prior to its delivery to said intermediate effect by the entrained air and steam wasted from the said first-mentioned group of effects.

6. A process of multiple-effect evaporation, which comprises generating steam from the liquor in the first of a series of progressively colder effects, causing the steam generated from the liquor of each effect to flow to the next colder effect for the generation of steam from the liquor therein, causing the liquor to flow from an intermediate effect backwardly in sequence through the preceding progressively hotter effects, and thence forwardly in sequence through the remaining progressively colder effects, causing the liquor passing from the first-mentioned group of effects to the second-mentioned group of effects to heat the liquor passing from effect to effect in the first-mentioned group of effects, and heating the liquor prior to its delivery to said intermediate effect by the entrained air and steam wasted from the said first-mentioned group of effects.

7. A process of multiple-effect evaporation, which comprises generating steam from the liquor in the first of a series of progressively colder effects, causing the steam generated from the liquor of each effect to flow to the next colder effect for the generation of steam from the liquor therein, causing the liquor to flow from an intermediate effect backwardly in sequence through the preceding progressively hotter effects, and thence forwardly in sequence through the remaining progressively colder effects, and automatically controlling the delivery of the liquor to each effect by the outflow of liquor partially concentrated in such effect.

8. A process of evaporation, which comprises continuously spraying the liquor simultaneously into a multiplicity of tubes which are substantially horizontal throughout their entire length, externally heating said tubes and creating and maintaining therein an atmosphere supplied solely by such liquor, and separating at the further ends of said tubes the resulting steam from the unevaporated liquor, all without the formation of a hydrostatic head.

9. A process of evaporation, which comprises spraying the liquor and causing it to enter simultaneously into the ends of a plurality of tubes which are substantially horizontal throughout their entire length; in a volume insufficient to fill said tubes with said liquor, externally heating said tubes and generating therein an atmosphere supplied solely by such liquor, and separating at the further ends of said tubes the resulting steam issuing from said tubes from the resulting unevaporated liquor, all without the formation of a hydrostatic head.

10. A process of multiple-effect evaporation, which comprises conducting liquor from an intermediate effect backwardly through the progressively hotter effects of a series of effects and thence forwardly through progressively colder effects, heating the liquor in the first effect of the series by externally-formed steam, heating the liquor in each of the remaining progressively colder effects by steam formed in the immediately preceding hotter effect, collecting the liquor from each effect at a level to prevent the formation of a static head of liquor therein, and delivering such liquor under mechanically applied pressure in the form of spray into the next appropriate effect.

11. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, and conducting the steam formed from the liquor in each effect to the next colder effect for the generation of steam from the liquor therein contained.

12. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, conducting the steam formed from the liquor in each effect to the next colder effect for the generation of steam from the liquor therein contained, and delivering the liquor to and removing it from each effect without the formation of a static head therein.

13. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, conducting the steam formed from the liquor in each effect to the next colder effect for the generation of steam from the liquor therein contained, collecting the liquor from each effect in a pool at a level below the effect to prevent the formation of a static head of liquor therein, and applying pressure externally of the effects to the liquor to deliver it in the form of spray into each effect.

14. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, conducting the steam formed from the liquor in each effect to the next colder effect for the generation of steam from the liquor therein contained, collecting the liquor from each effect in a pool at a level below the effect to prevent the formation of a static head of liquor therein, applying pressure externally of the effects to the liquor to deliver it in the form of spray into each effect, and automatically controlling the supply of liquid to each effect by the level of the pool of liquor delivered from such effect.

15. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, conducting the steam formed from the liquor in each effect to the next colder effect for the generation of steam from the liquor therein contained, and cooling such liquor prior to its delivery to said last-mentioned effects to a temperature approximating the boiling point of liquor in that effect to which it is delivered.

16. A process of evaporating an initially hot liquor, which comprises delivering such liquor to that intermediate effect of a series of effects in which the boiling point of the liquor therein nearly approaches the temperature of the entering liquor, conducting the liquor from such effect through a plurality of increasingly hotter effects, and thence through a plurality of increasingly colder effects, conducting the steam formed from the liquor in each effect to the next colder effect for the generation of steam from the liquor therein contained, and passing the liquor flowing from effect to effect in the first-mentioned group of effects in heat-conducting counter-current flow to the liquor flowing from the first-mentioned group of effects to the second-mentioned group of effects for the exchange of heat, thereby cooling the last-mentioned liquor and progressively heating the first-mentioned liquor as it passes from effect to effect.

17. A process of evaporation, which comprises subjecting the liquor to be evaporated to pressure, and distributing it in the form of spray into substantially horizontal conducting tubes at one end thereof, externally heating such tubes to heat the liquor therein to the boiling point, and withdrawing and separating the unevaporated liquor and the steam formed from such liquor, all without the formation of a hydrostatic head.

18. A process of evaporation, which comprises externally heating a plurality of substantially horizontal tubes, uniformly distributing the liquor to be evaporated simultaneously into the open ends of such tubes to supply to each tube an amount of liquor less than required to fill it, whereby the liquor in each tube is caused to foam and wet the interior surface of each tube, and withdrawing and separating the steam and unevaporated liquor, without the formation of a hydrostatic head in such tubes.

19. A process of evaporation, which comprises spraying liquor under mechanically-generated pressure into a plurality of substantially horizontally arranged tubes, externally heating such tubes to boil the liquor therein, separating the steam and the unevaporated liquor issuing from said tubes without the formation of a hydrostatic head therein, and controlling the supply of liquor to said tubes by outflow of the unevaporated liquor from said tubes.

20. A process of evaporation, which comprises spraying liquor under mechanically-generated pressure into a plurality of substantially horizontally arranged tubes at the end thereof, externally heating such tubes to boil the liquor therein, separating the steam and the unevaporated liquor issuing from said tubes at the other end thereof without the formation of a hydrostatic head in said tubes, collecting the unevaporated liquor in a pool, and regulating the supply of liquor to said tubes by the level of liquor in said pool.

21. A process of evaporation, which comprises continuously spraying liquor under pressure into a plurality of open-end conductor tubes at one end thereof, heating said tubes to boil the liquor therein, continuously withdrawing from the other ends of the tubes the vapor and the unevaporated liquor passing through said tubes without the formation of a hydrostatic head therein, and continuously spraying and recirculating a portion of said last-mentioned liquor into and through said tubes for further evaporation.

22. A process of multiple-effect evaporation, which comprises passing liquor into each of a series of effects in predetermined sequence by pressure applied to the liquor externally of said effects and causing said liquor to flow substantially horizontally, thereby preventing the formation of a static head in said effects, boiling the liquor while flowing horizontally in one of the effects by externally generated heat, and boiling the liquor in each of the other effects while flowing horizontally therein by steam generated from the liquor in another of said effects.

23. A combined evaporator and condenser having substantially horizontal conductor tubes for receiving the liquor to be evaporated, a steam chamber surrounding such tubes and not in communication with the interior thereof, and means for distributing the liquor into the tubes without the formation of a static head in said evaporator and condenser.

24. A combined evaporator and condenser having substantially horizontal conductor tubes for receiving the liquor to be evaporated, a steam chamber surrounding such tubes and having no communication with the interior thereof, means for distributing the liquor into the tubes, and mechanical means for supplying liquor under pressure to said distributing means.

25. A combined evaporator and condenser having substantially horizontal conductor tubes for receiving the liquor to be evaporated, a steam chamber surrounding such tubes and having no communication with the interior thereof, means for distributing the liquor into the tubes, and a pump for supplying liquor under pressure to said distributing means.

26. A combined evaporator and condenser having substantially horizontal open end conductor tubes for receiving the liquor to be evaporated, a steam chamber surrounding such tubes and having no communication with the interior thereof, and a pump and a spraying device for distributing the liquor into said tubes simultaneously at one end thereof.

27. A combined evaporator and condenser, comprising a horizontally arranged shell having a plurality of substantially horizontal open end conductor tubes and transverse tube sheets forming a steam chamber around said tubes, means at one end of the shell for spraying liquor to be evaporated into said tubes simultaneously at one end thereof, and means at the other end of the shell for separating and conducting away the steam and the unevaporated liquor issuing from said tubes.

28. A combined evaporator and condenser, comprising a shell having a plurality of substantially horizontal conductor tubes and transverse tube sheets forming a steam chamber around said tubes, and a nozzle for distributing the liquor in finely divided form into the conductor tubes simultaneously at one end thereof.

29. A combined evaporator and condenser, comprising a substantially horizontal elongated shell having a plurality of conductor tubes which are substantially horizontal throughout their entire length and transverse tube sheets forming a steam chamber around said tubes, means at one end of the shell for spraying liquor to be evaporated into said tubes, and a well at the other end of the shell and below said tubes for receiving unevaporated liquor issuing from the tubes.

30. A combined evaporator and condenser, comprising a substantially horizontal shell, heads at the ends thereof, transverse tube sheets intermediate the said heads for forming a steam chamber, conductor tubes extending between the tube sheets and through the steam chamber, means at one end of the shell for conducting away the unevaporated liquor issuing from said tubes, and means at the other end of the shell for distributing the liquor under pressure, other than the hydrostatic pressure, to said conductor tubes.

31. A combined evaporator and condenser, comprising a substantially horizontal shell, heads at the ends thereof, transverse tube sheets intermediate the said heads for forming a steam chamber, conductor tubes extending between the tube sheets and through the steam chamber, means at one end of the shell for conducting away the unevaporated liquor issuing from said tubes, and spraying means at the other end of the shell for delivering liquor in the form of spray into said tubes, in combination with a pump for supplying liquor under pressure to said spraying means.

32. A combined evaporator and condenser, comprising a substantially horizontal shell, heads at the ends thereof, transverse tube sheets intermediate the said heads for forming a steam chamber, conductor tubes which are substantially horizontal throughout their entire length extending between the tube sheets and through the steam chamber, means at one end of the shell for conducting away the unevaporated liquor issuing from said tubes, spraying means at one end of the shell for distributing liquor directly into said tubes, and a well at the other end of said shell below the level of the tubes for receiving the unevaporated liquor issuing from said tubes.

33. In combination with a combined evaporator and condenser having substantially horizontally arranged open end conductor tubes extending through the steam chamber, in combination with means for distributing liquor in the form of spray to said tubes simultaneously at one end thereof, and automatic means for controlling the flow of liquor to said distributing means.

34. In combination with a combined evaporator and condenser having substantially horizontally arranged open end conductor tubes extending through the steam chamber, in combination with means for distributing liquor in the form of spray to said tubes at one end thereof, a well for receiving and discharging the unevaporated liquor issuing from said tubes and located below the other end of said tubes, and means, automatically controlled by the height of liquor in said well, for automatically controlling the supply of liquor to said distributing means.

35. In combination with a combined evaporator and condenser having substantially horizontally arranged conductor open end tubes extending through the steam chamber, in combination with means for distributing liquor in the form of spray to said tubes, a well located below the delivery end of said tubes for receiving and discharging the unevaporated liquor issuing from said tubes, a liquor-containing float tank communicating with said well, and having the level of liquor therein controlled by the level of liquor in said well, means for conducting liquor from said well without passing through said float tank, a valve, controlling the supply of liquor to said distributing means, and a float located in said tank for automatically controlling said valve.

36. In combination with a combined evaporator and condenser having substantially horizontally arranged conductor open end tubes extending through the steam chamber, in combination with means for distributing liquor in the form of spray to said tubes simultaneously at one end thereof, a well located below the delivery end of said tubes for receiving and discharging the unevaporated liquor issuing from said tubes, a valve controlling the supply of liquor to said distributing means, and means controlled by the level of liquor in said well for automatically controlling said valve.

37. In combination with a combined evaporator and condenser having substantially horizontally arranged conductor tubes extending through the steam chamber, in combination with means for distributing liquor in the form of spray to said tubes, a well below said tubes for receiving and discharging the unevaporated liquor issuing from said tubes whereby the formation of a hydrostatic head in said tubes is prevented, a valve controlling the supply of liquor to said distributing means, and means located exterior to said well but controlled by the level of liquor in said well for automatically operating said valve.

38. A combined condenser and evaporator, comprising a shell having tube sheets between its ends forming a steam chamber, and a plurality of rows of substantially horizontal tubes extending between the tube sheets through the steam chamber, means at one end of the shell for distributing liquor in the form of spray to said tubes, and means adjacent the receiving ends of the tubes for receiving the spray not entering the tubes and delivering it into said tubes.

39. A combined condenser and evaporator, comprising a shell having tube sheets between its ends forming a steam chamber, and a plurality of rows of substantially horizontal tubes extending between the tube sheets through the steam chamber, means at one end of the shell for distributing liquor in the form of spray to said tubes, and troughs adjacent the receiving ends of said tubes for delivering to the tubes the spray which does not directly enter said tubes.

40. A combined condenser and evaporator, comprising a shell having tube sheets between its ends forming a steam chamber, and a plurality of rows of substantially horizontal tubes extending between the tube sheets through the steam chamber, means at one end of the shell for distributing liquor to said tubes, and plates adjacent the receiving ends of said tubes to receive and deliver liquor into said tubes.

41. A combined condenser and evaporator, comprising a shell having tube sheets between its ends forming a steam chamber, and a plurality of rows of substantially horizontal tubes extending between the tube sheets through the steam chamber, means at one end of the shell for distributing liquor to said tubes, and a plate fixed to a tube sheet and adjacent the receiving ends of the tubes in each row to receive and deliver liquor into said tubes.

42. A combined condenser and evaporator, comprising a shell having tube sheets between its ends forming a steam chamber, and a plurality of rows of substantially horizontal tubes extending between the tube sheets through the steam chamber, means at one end of the shell for dstributing liquor to said tubes, and a plate fixed to a tube sheet and adjacent the receiving ends of the tubes in each row to receive and deliver liquor into said tubes, some of said plates being wider than others.

43. A combined evaporator and condenser, comprising a cylindrical shell composed of sections, heads at the ends of the shell, tube sheets spaced from the heads forming a steam chamber between them, a plurality of substantially horizontal tubes extending through said steam chamber for the liquor to be evaporated, an intermediate tube sheet for supporting the tubes between the first-mentioned tube sheets, and dividing the steam chamber into a plurality of compartments, means for introducing steam into said compartments, means for conducting the condensate from the lower portion of said compartments, and means at the upper portion of said compartments for the discharge of steam and entrained air from the said compartments.

44. A multiple-effect evaporator, comprising a series of effects, means for supplying steam to the effect at one end of the series, vacuum-producing means connected to the effect at the other end of the series, means for conducting steam generated from the liquor in each effect to the steam chamber of the next colder effect of the series, means for supplying the liquor to be evaporated to an intermediate effect of the series, means for conducting the liquor from said intermediate effect through the progessively hotter effects in sequence, and means for conducting the liquor from the last-mentioned effect through the remaining progressively colder effects in sequence.

45. A multiple-effect evaporator, comprising a series of effects, means for supplying steam to the effect at one end of the series, vacuum-producing means connected to the effect at the other end of the series, means for conducting steam generated from the liquor in each effect to the steam chamber of the next colder effect, means for supplying liquor to be evaporated to an intermediate effect of the series, and means for conducting the liquor from said effect through the progressively hotter effects and thence through effects which are progressively colder than said intermediate effect.

46. A multiple-effect evaporator, comprising a series of effects, means for supplying steam to the effect at one end of the series, vacuum-producing means connected to the effect at the other end of the series, means for conducting steam generated from the liquor in each effect to the steam chamber of the next colder effect, means for supplying liquor to be evaporated to an intermediate effect of the series, means for conducting the liquor from said effect through the progressively hotter effects and thence through effects which are progressively colder than said intermediate effect, and means by which the liquor to be evaporated is heated prior to its delivery to said intermediate effect by entrained air and steam from said progressively hotter effects.

47. A multiple-effect evaporator comprising a series of effects, means for supplying steam to the effect at one end of the series, vacuum-producing means connected to the effect at the other end of the series, means for conducting steam generated from the liquor in each effect to the steam chamber of the next colder effect, means for supplying liquor to be evaporated to an intermediate effect of the series, means for conducting the liquor from said effect through the more progressively hotter effects and thence through effects which are progressively colder than said intermediate effect, and means by which said liquor in its passage to said progressively colder effects heats the liquor passing betwen the effects of said progressively hotter effects.

48. A multiple-effect evaporator, comprising a series of effects, means for supplying steam to the effect at one end of the series, vacuum-producing means connected to the effect at the other end of the series, means for conducting liquor to and withdrawing it from each effect of the series and having provisions for preventing the formation of a hydrostatic head in the effects, and means by which the partially evaporated liquor is heated in passing between some of the effects.

49. A multiple-effect evaporator, comprising a series of effects, means for supplying steam to the effect at one end of the series, vacuum-producing means connected to the effect at the other end of the series, means for conducting the liquor though the effects in a predetermined order, and means by which waste steam escaping from the steam chambers of some of the effects heats the liquor to be evaporated prior to its delivery to the effects.

50. A multiple-effect evaporator, comprising a series of effects, means for supplying steam to the effect at one end of the series, vacuum-producing means connected to the effect at the other end of the series, means for initially supplying the liquor to an intermediate effect of the series, and means for conducting the liquor from said intermediate effect through the progressively hotter effects and thence in sequence through those effects which are progressively colder than said intermediate effect.

51. A multiple-effect evaporator, comprising a series of effects, means for supplying steam to the effect at one end of the series, vacuum-producing means connected to the effect at the other end of the series, each effect consisting of a combined evaporator and condenser having open end conductor tubes which are substantially horizontal throughout their entire length, a pump and a distributor for distributing the liquor into the open ends of all of the tubes of each effect, and means for the discharge of liquor from each effect having provisions for preventing the formation of a hydrostatic head therein.

52. A multiple-effect evaporator, comprising a series of effects, means for supplying steam to the effect at one end of the series, vacuum-producing means connected to the effect at the other end of the series, each effect consisting of a combined evaporator and condenser having substantially horizontal open end conductor tubes, a pump and a distributor for distributing the liquor simultaneously into open ends of the tubes of each effect, means for the discharge of liquor from each effect having provisions for preventing the formation of a hydrostatic head, and automatic means governed by the discharge of liquor from each effect for controlling the supply of liquor to such effect.

53. A multiple-effect evaporator, comprising a plurality of effects, each consisting of a combined condenser and evaporator having substantially horizontal conductor tubes passing through a steam chamber, a well below the tubes thereof for receiving the liquor from each effect, a nozzle in each effect to spray the liquor to the tubes thereof, and a pump for pumping the liquor to the nozzle of each effect from the well of another effect.

54. A multiple-effect evaporator, comprising a plurality of effects, each consisting of a combined condenser and evaporator having substantially horizontal open end conductor tubes passing through a steam chamber, a well for receiving the liquor from each effect, a nozzle in each effect to spray the liquor simultaneously to the tubes at the open ends thereof, a pump by which liquor is pumped to the nozzle of each effect from the well of another effect, and automatic means controlled by the level of liquor in the well of each effect for controlling the supply of liquor to the nozzle of such effect.

55. A multiple-effect evaporator, comprising a plurality of effects, each consisting of a combined condenser and evaporator having substantially horizontal conductor tubes passing through a steam chamber, a plurality of heat exchangers, means for conducting the liquor discharged from the plurality of effects to said heat exchangers in series, and means for conducting the liquor passing from each effect to an adjacent effect through said heat exchangers, whereby the liquor discharged from the plurality of effects heats the liquor supplied to each of the effects.

56. In combination, a combined condenser and evaporator, a pump for supplying liquor thereto, a balanced valve for controlling the supply of liquor from the pump, a well located below said combined evaporator and condenser for receiving unevaporated liquor therefrom, and means controlled by the liquor in said well for operating said balanced valve.

57. A multiple-effect evaporator, comprising a plurality of effects, means for delivering steam to the first of said effects, a vacuum-producing apparatus connected to the last of said effects, a heat exchanger and condenser connected to each effect to condense steam wasted with air therefrom, means by which the formation of a hydrostatic head in the tubes of each effect is prevented, and means for passing the liquor to be evaporated through said heat exchangers and condensers in series.

58. A multiple-effect evaporator, comprising a plurality of effects, means for conducting steam to the first of said effects, a vacuum-producing apparatus connected to the last of said effects, a well connected to the steam chamber of each effect to receive water of condensation therefrom, and automatic means controlling the discharge of water from each well.

59. A multiple-effect evaporator, comprising a plurality of effects, means for conducting steam to the first of said effects, a vacuum-producing apparatus connected to the last of said effects, a well connected to the steam chamber of each effect to receive water of condensation therefrom, and a float-controlled balanced valve for controlling the discharge of water from each well.

60. A process of multiple-effect evaporation, which comprises conducting liquor, which increases in viscosity when concentrated, through a series of increasingly hotter effects, heating the liquor in the hottest effect by exteriorly generated heat, heating the liquor in each of the succeeding colder effects by steam generated in the preceding hotter effect, and causing the liquor to pass through each effect without the formation of a static head therein, whereby the tendency to increased viscosity of the liquor is overcome by the increasing temperatures to which the liquor is progressively subjected and the temperature difference between the effects and the area of the conducting surfaces may be decreased.

61. A multiple-effect evaporator comprising a plurality of effects, means for connecting said effects in sequence so that the steam generated from the liquor in each effect is transferred to the next colder effect for the evaporation of liquor therein, means for heating the liquor in the first effect for the generation of steam, a vacuum apparatus connected to the last effect of the series, means for introducing the liquor to be evaporated to an effect which is intermediate in the sequence of effects, and means for conducting the liquor therefrom through some of said effects in series in one direction and through other of said effects in series in the opposite direction.

62. A process of multiple-effect evaporation, which comprises generating steam from the liquor in the first effect of a series of progressively colder effects, causing the steam generated from the liquor of each effect to flow to the next colder effect for the generation of steam from the liquor therein, introducing the liquor to be evaporatively separated into an intermediate effect, and conducting the liquor therefrom through certain of the remaining effects in one direction and through others of said effects in the opposite direction, in reference to the flow of steam through the sequence of effects.

In testimony whereof I have affixed my signature.

HUGH K. MOORE.